United States Patent
Attanasio

(10) Patent No.: US 7,462,008 B2
(45) Date of Patent: Dec. 9, 2008

(54) STRUCTURAL FASTENERS AND COMPONENTS THEREOF

(75) Inventor: Gerard E. Attanasio, Middlebury, CT (US)

(73) Assignee: Pilgrim Screw Corporation, Providence, RI (US)

(*) Notice: Subject to any disclaimer, the term of this patent is extended or adjusted under 35 U.S.C. 154(b) by 99 days.

(21) Appl. No.: 11/068,531

(22) Filed: Feb. 28, 2005

(65) Prior Publication Data

US 2005/0207866 A1 Sep. 22, 2005

(51) Int. Cl.
*F16B 35/04* (2006.01)
*F16B 37/04* (2006.01)

(52) U.S. Cl. .................. 411/353; 411/111

(58) Field of Classification Search ........... 411/352, 411/353, 107, 417, 178, 108, 111–113
See application file for complete search history.

(56) References Cited

U.S. PATENT DOCUMENTS

| | | | |
|---|---|---|---|
| 546,173 A | 9/1895 | Martin, Jr. | |
| 1,163,897 A * | 12/1915 | Dodds | ........................ 411/418 |
| 1,869,947 A | 8/1932 | Shook | |
| 2,144,553 A | 1/1939 | Simmonds | |
| 2,356,162 A | 8/1944 | Johnson et al. | |
| 2,385,893 A | 10/1945 | Taylor | |
| 2,394,491 A | 2/1946 | Schaper | |
| 2,423,432 A | 7/1947 | Barlow | |
| 2,486,411 A | 11/1949 | Huelster | |
| 2,567,864 A | 9/1951 | Becker | |
| 2,640,245 A | 6/1953 | Becker | |
| 2,730,154 A | 1/1956 | Aspey | |
| 2,737,222 A | 3/1956 | Becker | |
| 2,843,907 A | 7/1958 | Zahodiakin | |
| 2,878,542 A | 3/1959 | Summers et al. | |
| 2,922,211 A | 1/1960 | Boyd | |
| 2,975,667 A | 3/1961 | Bross | |
| 2,984,884 A | 5/1961 | Chapman et al. | |
| 3,041,657 A * | 7/1962 | McNinch | ..................... 16/105 |
| 3,062,253 A | 11/1962 | Millhelser | |
| 3,141,487 A | 7/1964 | Boyd | |
| 3,149,654 A | 9/1964 | Podell | |
| 3,203,027 A * | 8/1965 | Ohman | ........................ 16/105 |
| 3,203,041 A | 8/1965 | Beuter et al. | |
| 3,504,875 A | 4/1970 | Johnson et al. | |
| 3,643,529 A * | 2/1972 | Bright | ........................ 16/96 R |
| 3,783,922 A | 1/1974 | Petrus | |
| 4,069,855 A | 1/1978 | Petroshanoff | |
| 4,119,131 A | 10/1978 | Cosenza | |
| 4,123,180 A | 10/1978 | Nehma | |
| 4,128,923 A | 12/1978 | Bisbing | |
| 4,232,496 A | 11/1980 | Warkentin | |
| 4,285,380 A * | 8/1981 | Gulistan | ..................... 411/103 |
| 4,324,517 A | 4/1982 | Dey | |

(Continued)

*Primary Examiner*—Flemming Saether
(74) *Attorney, Agent, or Firm*—Salter & Michaelson

(57) ABSTRACT

A captive structural fastener includes an integral hold-out feature. The fastener includes a stud assembly including a stud, a retaining ring including two oppositely disposed tabs protruding toward the center of the retaining ring, a first sleeve that is mainly engageable with a second sleeve, the second sleeve including an inwardly disposed channel for receiving the retaining ring; and a receptacle assembly, the receptacle assembly including a bracket constructed and arranged to be secured to a panel, an internally threaded nut, a retaining clamp for securing the nut in the bracket, and a grommet assembly having a bore for receiving the stud therethrough.

26 Claims, 25 Drawing Sheets

U.S. PATENT DOCUMENTS

| | | |
|---|---|---|
| 4,464,090 A | 8/1984 | Duran |
| 4,616,967 A | 10/1986 | Molina |
| 4,712,957 A | 12/1987 | Edwards et al. |
| 4,723,881 A | 2/1988 | Duran |
| 4,747,738 A * | 5/1988 | Duran ......................... 411/353 |
| 4,759,671 A | 7/1988 | Duran |
| 4,828,442 A | 5/1989 | Duran |
| 4,854,795 A | 8/1989 | Duran |
| 4,865,500 A | 9/1989 | Duran et al. |
| 4,884,930 A | 12/1989 | Dobbeler |
| 4,911,726 A * | 3/1990 | Warkentin ................. 81/124.2 |
| 4,975,007 A | 12/1990 | Molina |
| 5,028,191 A | 7/1991 | Rowley et al. |
| 5,056,208 A | 10/1991 | Stafford |
| 5,073,070 A * | 12/1991 | Chang ......................... 411/353 |
| 5,137,406 A | 8/1992 | Cosenza |
| 5,211,520 A | 5/1993 | McKinney |
| 5,338,139 A | 8/1994 | Swanstrom |
| 5,380,136 A | 1/1995 | Copple et al. |
| 5,405,228 A | 4/1995 | Reid et al. |
| 5,688,093 A | 11/1997 | Bowers |
| 5,690,460 A | 11/1997 | Attanasio |
| 5,704,748 A | 1/1998 | Criswell |
| 5,725,344 A | 3/1998 | Petrella |
| 5,743,690 A | 4/1998 | Royle |
| 5,860,779 A | 1/1999 | Toosky et al. |
| 5,947,668 A | 9/1999 | Thommes |
| 6,059,502 A | 5/2000 | Konig et al. |
| 6,131,291 A * | 10/2000 | Mock ......................... 30/266 |
| 6,276,883 B1 | 8/2001 | Unsworth et al. |
| 6,374,455 B1 * | 4/2002 | Regele et al. ................. 16/2.1 |
| 6,488,460 B1 * | 12/2002 | Smith et al. ................. 411/353 |
| 6,860,689 B1 | 3/2005 | Attanasio |
| 2004/0060723 A1 * | 4/2004 | Pallapothu ................ 174/65 G |

* cited by examiner

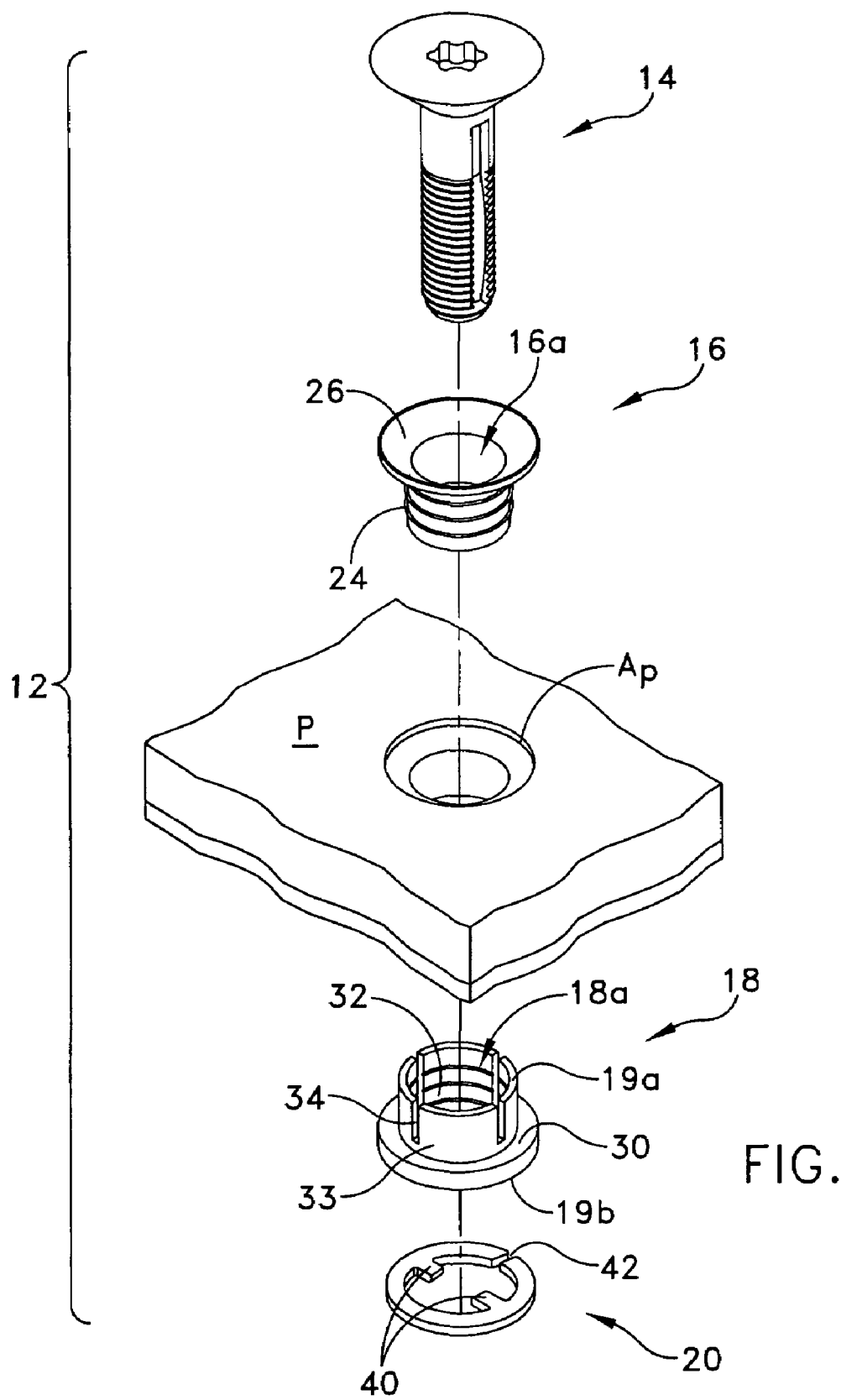

STRUCTURAL FASTENERS AND COMPONENTS THEREOF

BACKGROUND

1. Technical Field

This disclosure relates to a structural fastener and components thereof and, in particular, to a captive structural fastener with an integral hold-out feature and components thereof.

2. Related Cases

Benefit is hereby claimed under 35 U.S.C. § 120 of the filing date of commonly owned and co-pending U.S. patent application Ser. No. 10/137,011 filed on May 2, 2002, which is incorporated herein by reference in its entirety.

3. Background

A variety of fasteners or fastener assemblies (hereinafter "fasteners") are known for attaching a panel to a sub-structure. Such fasteners are typically designed for use in high stress environments, such as to protect aircraft access panels, and when used in such environments, are referred to as "structural" fasteners. Structural fasteners are used to maintain secure attachment of the panel to the sub-structure panel during conditions of excessive vibration and high loads applied to the panel during flight.

"Captive" fasteners include studs or screws that remain captive in the stud assembly when the panel is removed from the sub-structure. When panels in which captive fasteners have been installed are removed from the sub-structure, the studs remain with the cover, maintaining the position of the studs relative to the panel and eliminating the problem of stud loss or displacement.

Some captive fasteners have "hold-out" features that involve the use of a hollow stud in which a separate retaining mechanism is positioned. These types of studs are difficult to manufacture and assemble, and can be problematic in use because "foreign object debris" (FOD) accumulates in the hollow portion of the stud, over time leading to eventual failure of the fastener.

Captive fasteners are prone to failure for other reasons as well. One reason is due to the fact that other fasteners have reduced life due to breakage of retaining rings, as well as other components of the assemblies. When the retaining ring breaks, depending on the design of the fastener, it often may result in the screw or stud falling out of the assembly, defeating the purpose of using a "captive" fastener assembly.

Of course, breakage of any part of the fasteners may lead to failure and, in addition, may lead to failure of other fasteners if the debris travels and is accumulated in other, un-broken fasteners. Also, this debris could short-out electronic components associated with the aircraft.

Thus, a need in the art exists for a captive structural fastener that reduces or eliminates the problem of foreign object debris.

SUMMARY

The present disclosure provides a fastener that includes an integral "hold-out" feature that provides a closed and an extended position.

Another feature of the present disclosure is the provision of a solid, rather than hollow stud, which reduces the amount of foreign object debris. Even though a solid stud is preferred it is noted that in accordance with the present invention principles thereof can also be applied to hollow studs.

Another feature of the present disclosure is the provision of a retaining ring that "floats" within a sleeve, which sleeve protects the retaining ring and minimizes the chance of foreign object debris if the retaining ring should break.

Another feature of the present disclosure is the provision of a fastener with evenly distributed forces along the grommet assembly, rather than localized distribution of force at the tip of a stud. This results in a secure fit of the stud within the grommet assembly and decreases the chance that the stud may be inadvertently released from its captive position.

The fasteners of the present disclosure may also be configured and dimensioned to have a reduced "footprint" for use in relatively small and/or inaccessible areas.

In accordance with one aspect of the present invention there is provided a fastening assembly, comprising: a stud assembly including a stud, a retaining ring including two oppositely disposed tabs protruding toward the center of the retaining ring, a first sleeve that is matingly engageable with a second sleeve, the second sleeve including an inwardly disposed channel for receiving the retaining ring; and a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough; The stud includes a base, a head, and a shank disposed therebetween, the shank including an exterior surface having a threaded section, the exterior surface including at least two longitudinal channels, each channel including at least two engagement regions for engaging the tabs of the retaining ring.

In accordance with another aspect of the present invention there is provided a fastening assembly, comprising: a stud assembly including a stud, a retaining ring including two oppositely disposed tabs protruding toward the center of the retaining ring, and an upper grommet assembly including an inwardly disposed channel for receiving the retaining ring; and a receptacle assembly, the receptacle assembly including a bracket constructed and arranged to be secured to a panel, an internally threaded nut, a retaining clamp for securing the nut in the bracket, and a lower grommet assembly having a bore for receiving the stud therethrough. The stud includes a base, a head, and a shank disposed therebetween, the shank including an exterior surface having a threaded section, the exterior surface including at least two longitudinal channels, each channel including at least two engagement regions for engaging the tabs of the retaining ring. The lower grommet assembly comprises first and second sleeves that are engaged between a substrate panel to form said bore.

In accordance with still another aspect of the present invention there is provided a fastening assembly, comprising: a stud assembly including a stud, a retaining ring including two oppositely disposed tabs protruding toward the center of the retaining ring, and at least one sleeve including an inwardly disposed channel for receiving the retaining ring; and a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough. The stud includes a base, a head, and a shank disposed therebetween, the shank including an exterior surface having a threaded section, the exterior surface including at least two longitudinal channels, each channel including at least two engagement regions for engaging the tabs of the retaining ring. The retaining clamp engages both the bracket and the nut and provides a single point attachment of the receptacle assembly to the substrate panel.

The foregoing and other objects, features and advantages of the disclosure will be apparent from the following more particular description of preferred embodiments of the disclosure, as illustrated in the accompanying drawings in which like reference characters refer to the same parts throughout the different views. The drawings are not necessarily to scale, emphasis instead being placed upon illustrating the principles of the disclosure. The principles and features of this disclosure may be employed in varied and numerous embodiments without departing from the scope of the disclosure.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

The present disclosure is directed to a captive structural fastener that may be used in high stress environments for attaching a panel to a sub-structure, such as covers used to close access openings in panels of an aircraft.

The present fastener includes a solid externally threaded stud that includes an integral "hold-out" feature, which allows the stud to be positioned in a first, closed position and in a second, extended position. The present fastener also provides containment for the retaining ring, which may be relatively delicate and prone to breakage in comparison to other components of the fastener. By providing containment for the retaining ring, should the retaining ring break, the debris will be confined to the sleeve rather than becoming FOD that might jeopardize other parts. In a preferred embodiment, the fastener also may include a nut that distributes stress uniformly in the longitudinal direction of the barrel of the nut. The fastener is sized and dimensioned to be attached to a panel using a single bolt or rivet, which is advantageous for constricted or otherwise inaccessible regions.

Many features of the present fastener already are disclosed in co-pending U.S. patent application Ser. No. 10/137,011; for ease of explanation, some aspects will be described again herein with reference to an exemplary embodiment of the present disclosure.

Figure 1:
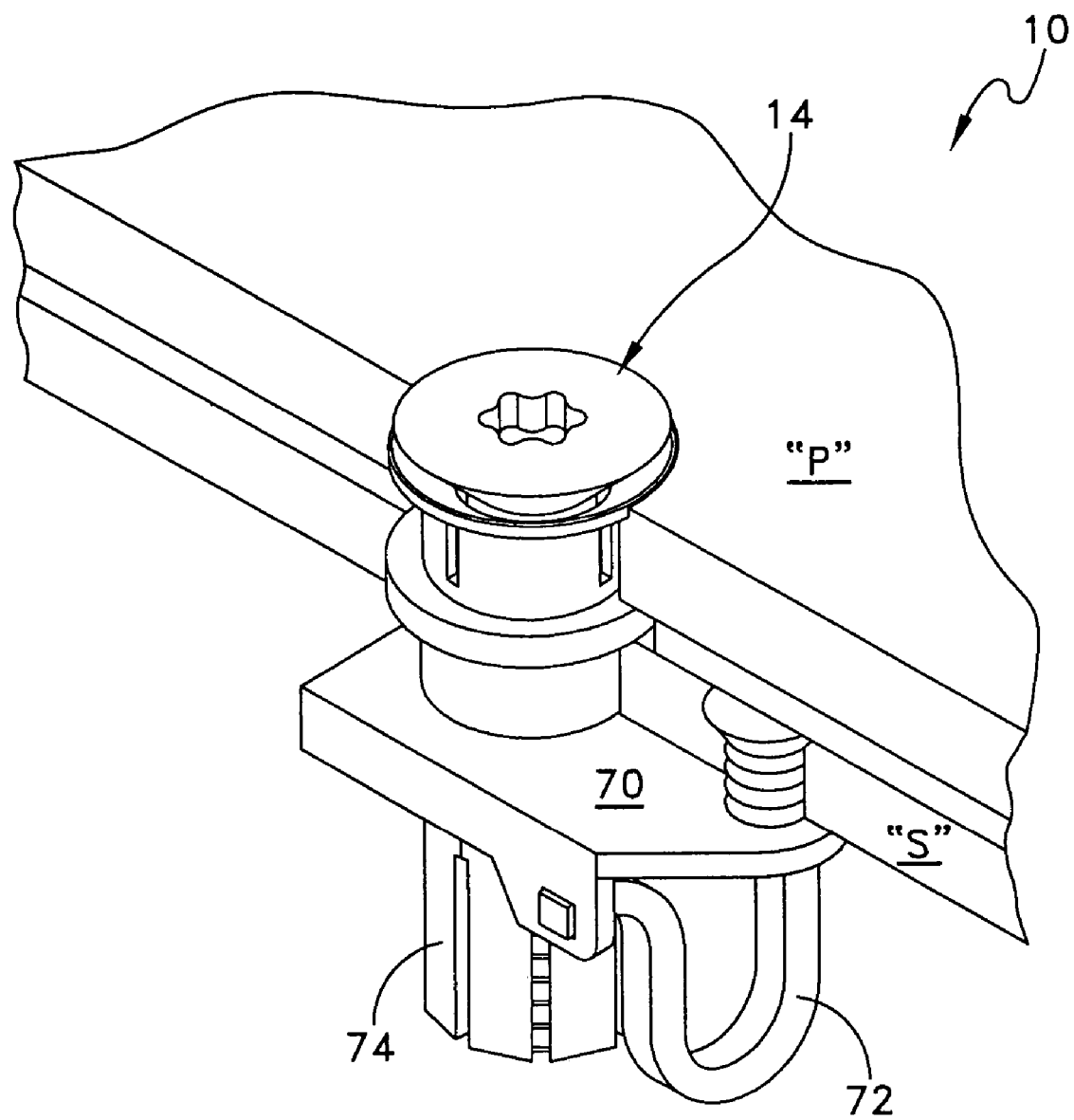
FIG. 1 is a perspective view of an exemplary embodiment of a fastener according to one embodiment of the present invention, showing a panel attached to a sub-structure by the fastener, and with the fastener in a closed position.
Figure 2:
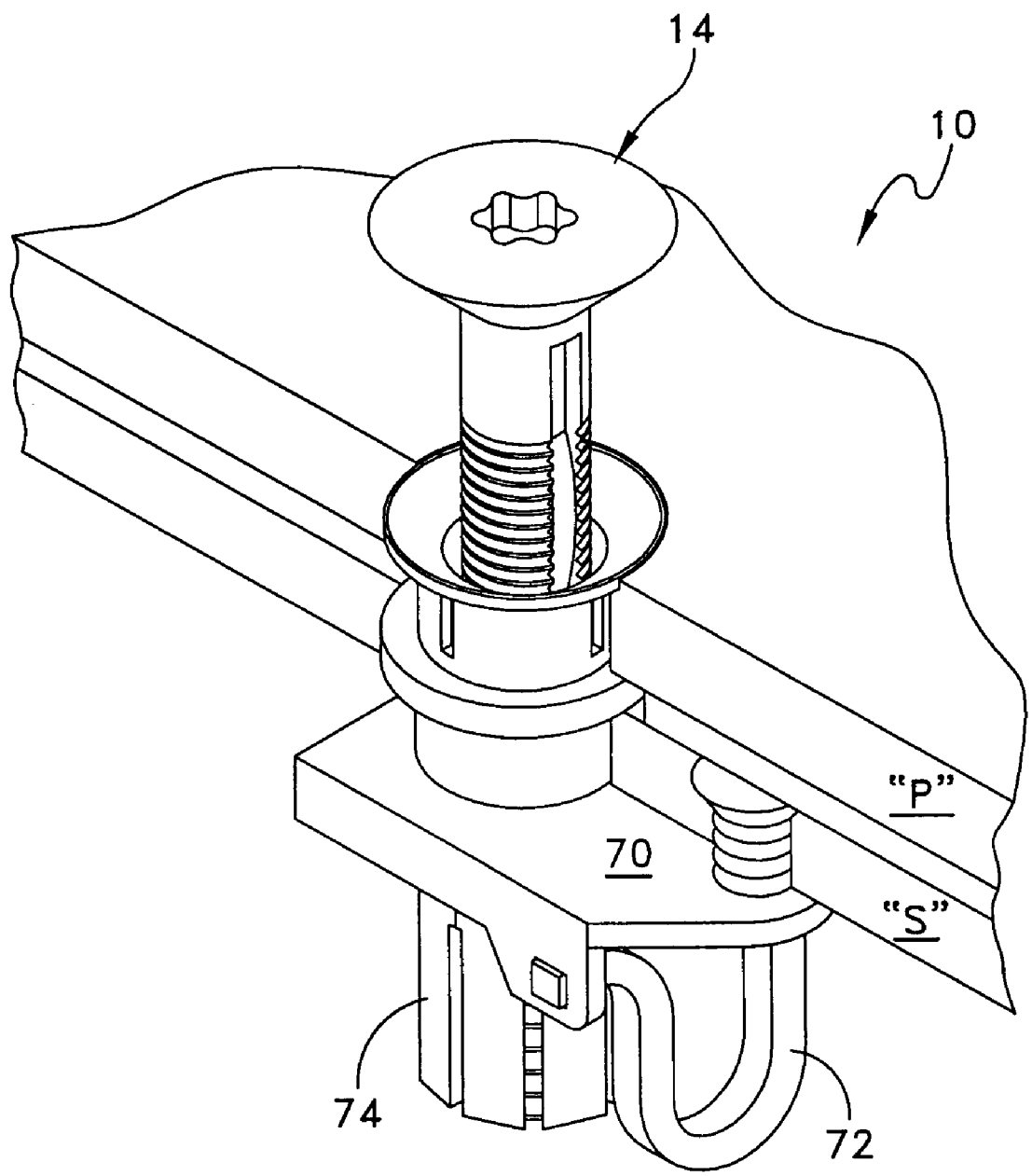
FIG. 2 is a perspective view of the fastener shown in FIG. 1, showing the fastener in an extended position.

One exemplary embodiment of a fastener 10 according to the present disclosure is indicated generally at 10 in FIGS. 1 and 2, where it is shown in an assembled configuration attaching a panel "P" to a sub-structure "S" with the stud in a first, closed position (FIG. 1), and in a second, extended position (FIG. 2).

Figure 3:
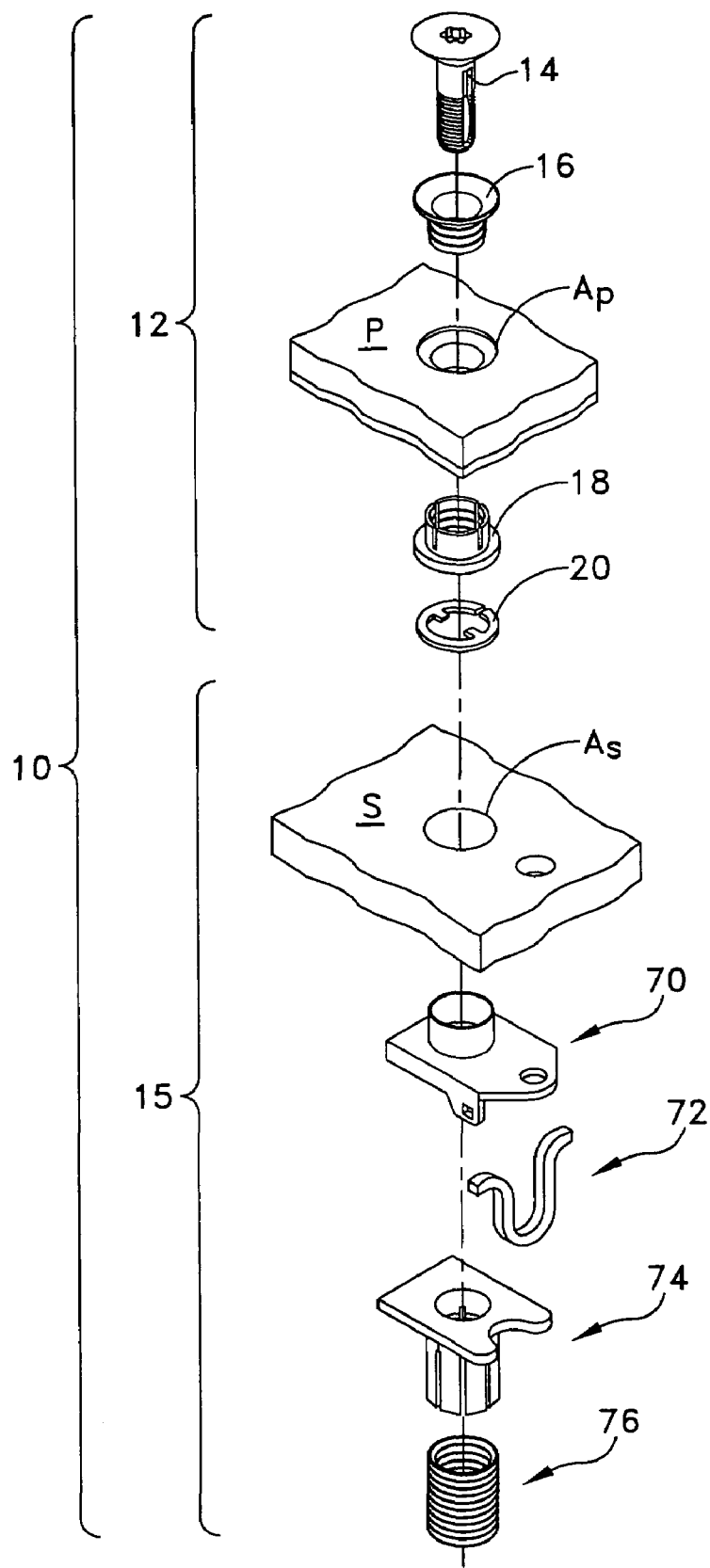
FIG. 3 is an exploded perspective view of the fastener shown in FIG. 1.

As shown in FIG. 3, fastener 10 includes a stud assembly indicated generally at 12 and a receptacle assembly indicated generally at 15. Stud assembly 12 is shown in greater detail in FIGS. 4 and 4A when taken together. As shown, stud assembly 12 includes a stud 14, an upper sleeve 16, a lower sleeve 18, and a retaining ring 20.

Upper sleeve 16 has a substantially cylindrical wall defining an opening 16a having a diameter sized and configured to receive stud 14 therein. A flange 26 extends outwardly from one end of opening 16a. Upper sleeve 16 has a substantially smooth interior surface 22, including the surface of flange 26, and a threaded exterior surface 24. Lower sleeve 18 has an upper edge 19a and a lower edge 19b, with an annular lip 30 extending outwardly from lower edge 19b. A substantially cylindrical wall defines an opening 18a sized and dimensioned to receive upper sleeve 16 therein. Lower sleeve 18 has a substantially smooth exterior surface 33 and a threaded interior surface 32 with a plurality of slots 34 extending from a region adjacent to annular lip 30 to upper edge 19a.

Annular lip 30 defines an interior channel 31 (see FIG. 4A) sized and dimensioned to receive retaining ring 20 therein, as described below. Retaining ring 20 preferably has a substantially planar circular shape and includes two opposed inwardly protruding tabs 40, and a slot 42 (see FIG. 4) that allow it to be compressed while being inserted into the interior channel 31 of lower sleeve 18. Lower sleeve 18 and, in particular, interior channel 31, provide containment to retaining ring 20 in case of breakage, thus minimizing FOD.

Figure 4A:
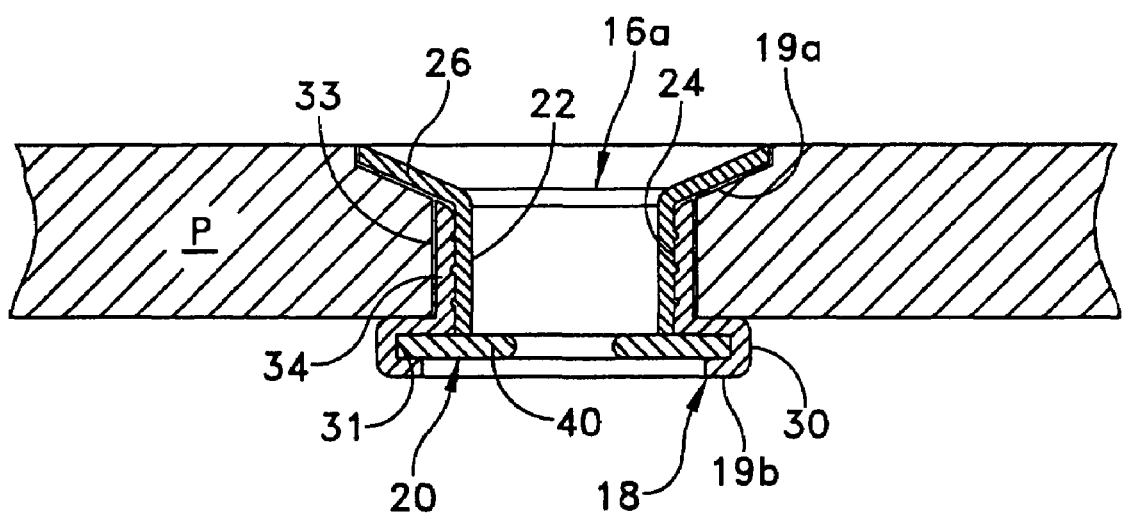
FIG. 4 is an exploded view of the stud assembly of the fastener shown in FIG. 2.

Thus when assembled as shown, retaining ring 20 is inserted into interior channel 31 of lower sleeve 18, and lower sleeve 18 is inserted into an aperture Ap. Thereafter, upper sleeve 16 is threaded into lower sleeve 18. FIG. 4 shows the parts in an exploded position while FIG. 4A shows the stud assembly 12 in its finally secured position.

Figure 5:
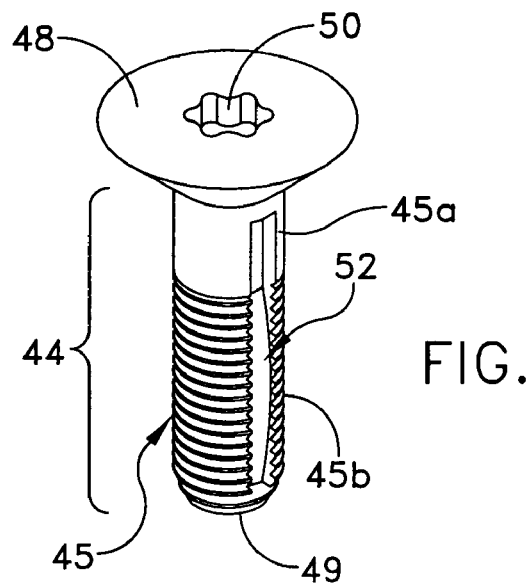
FIG. 5 is a perspective view of the stud shown in the stud assembly shown in FIG. 3.
Figure 6:
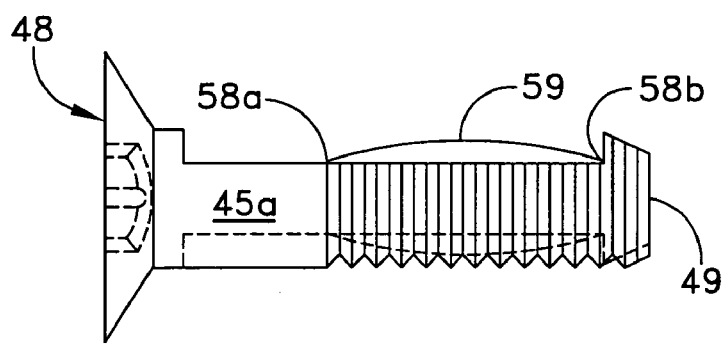
FIG. 6 is a sectional view of the stud shown in FIG. 4.
Figure 7:
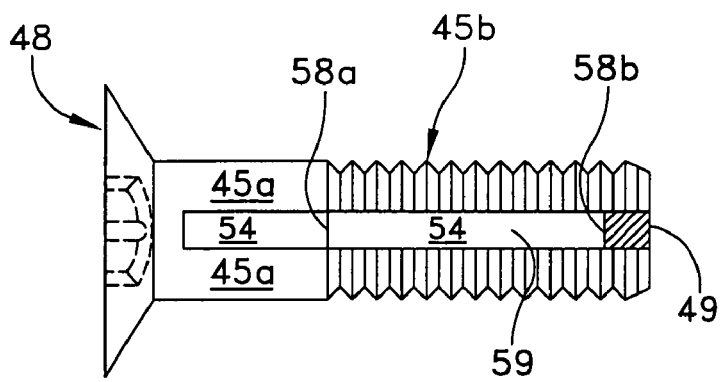
FIG. 7 is a side view of the stud shown in FIG. 4.

Stud 14 of stud assembly 12 is shown in greater detail in FIGS. 5-7. As shown, stud 14 is substantially symmetrical in construction, and includes a head 48 at one end thereof, a tip 49 at an opposite end thereof, and a shank 44 therebetween. Head 48 includes a recess 50 for receiving a tool.

Shank 44 has an outer surface 45 that includes a substantially smooth section 45a adjacent to head 48 and a threaded exterior surface section 45b extending from smooth section 45a substantially to tip 49. Two longitudinal retaining sections 52, which in the present embodiment are channels, are positioned diametrically opposite one another longitudinally on shank 44. For ease of description, retaining sections 52 will be referred to hereinafter as channels. Channels 52 extend from smooth section 45a of shank 44 through threaded section 45b, substantially to tip 49. Channels 52 preferably are recessed from exterior surface 45 of shank 44.

Each channel 52 includes at least two engagement regions; first engagement region 58a and second engagement region 58b. Engagement regions 58a and 58b are spaced apart by a spacing member 59, and are adapted to engage tabs 40 of retaining ring 20 when the stud and fasteners are assembled together, either in a closed position or in an extended position. In the present embodiment, spacing members 59 are defined by an arcuate region extending upwardly from a base 54 of channels 52. For ease of description, spacing members 59 will be referred to hereinafter as lobes. Lobes 59 preferably have a substantially smooth surface extending from the engagement region 58a to engagement region 58b.

Figure 8:
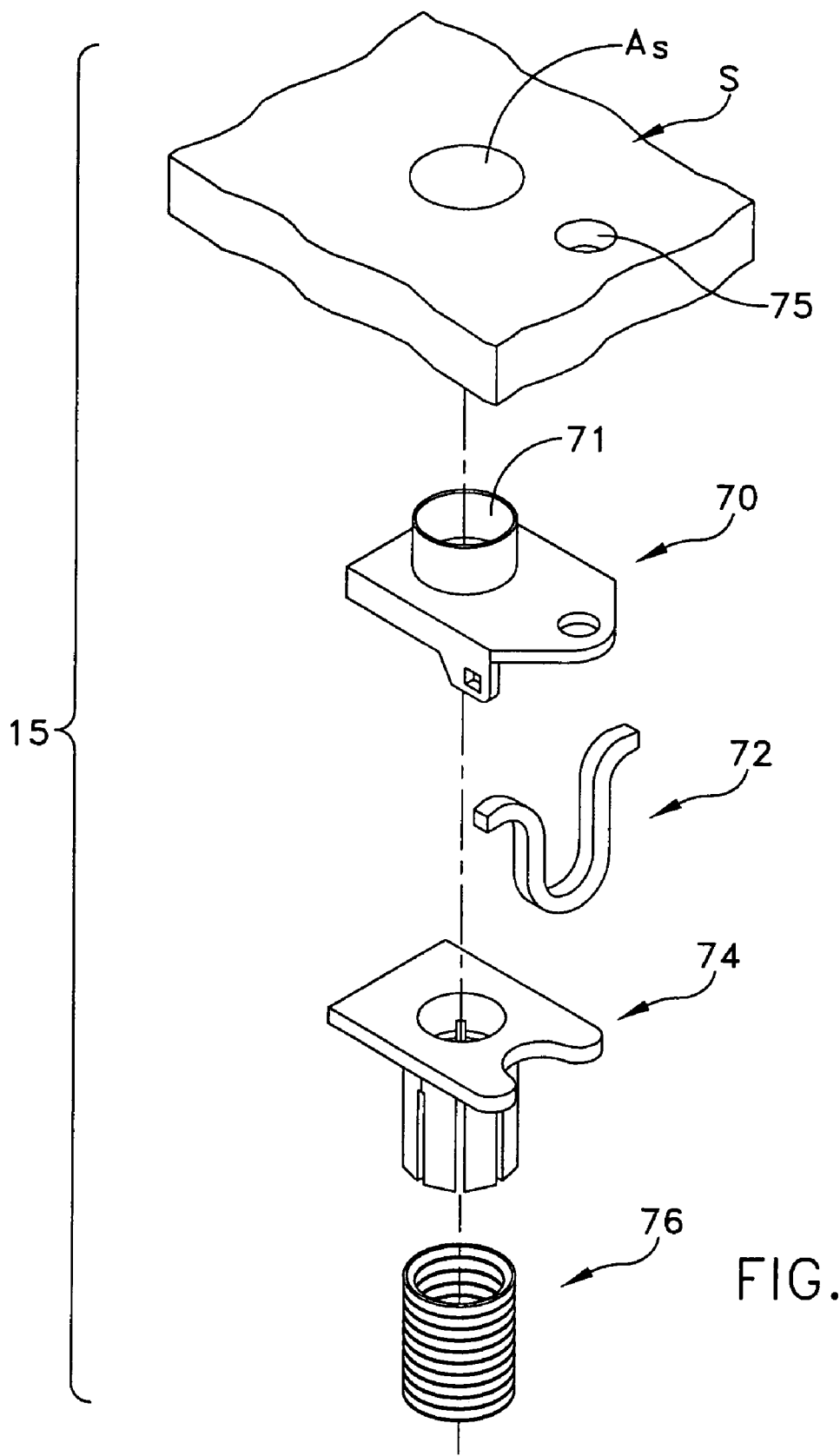
FIG. 8 is an exploded view of the receptacle assembly of the fastener shown in FIG. 3.

Receptacle assembly 14 is illustrated in greater detail in FIG. 8. As shown, receptacle assembly 14 includes a bracket or cage 70, a retaining clamp 72, a nut 74, and a spring, heli-coil or coil 76. Bracket 70 has a collar 71 that is adapted to fit into the aperture As. The retaining clamp 72 holds the nut 74 to the bracket or cage 70. A rivet (not shown) is placed in hole 75 to retain the cage 70 in place. Other details of the receptacle assembly are disclosed in the afore-mentioned commonly-owned and co-pending U.S. patent application Ser. No. 10/137,011, particularly the embodiment described in FIGS. 25-29.

Figure 9:
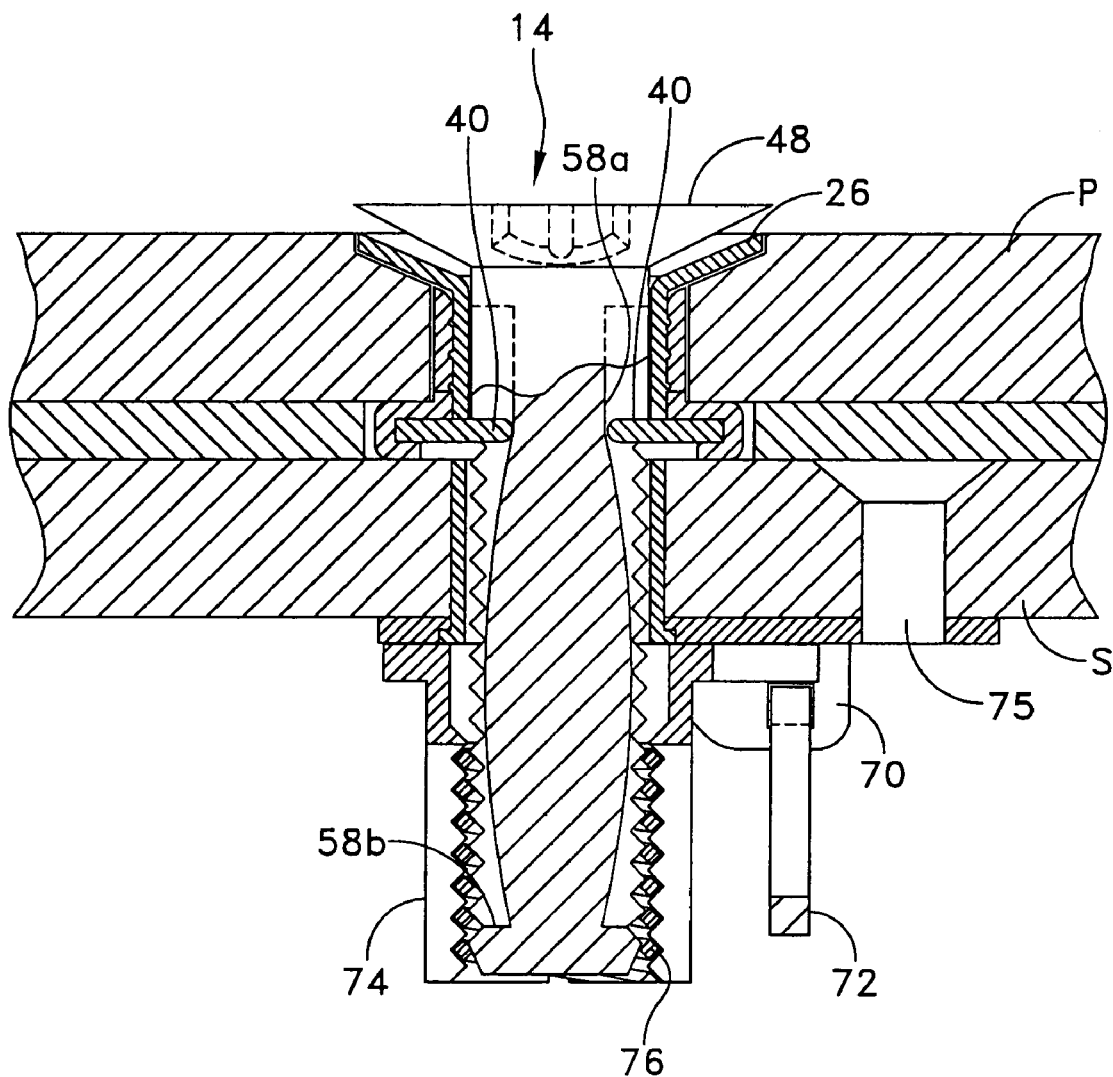
FIG. 9 is a sectional view of the fastener shown in FIG. 1, showing the retaining ring positioned in the first engagement region and the fastener is the closed position as shown in FIG. 1.
Figure 10:
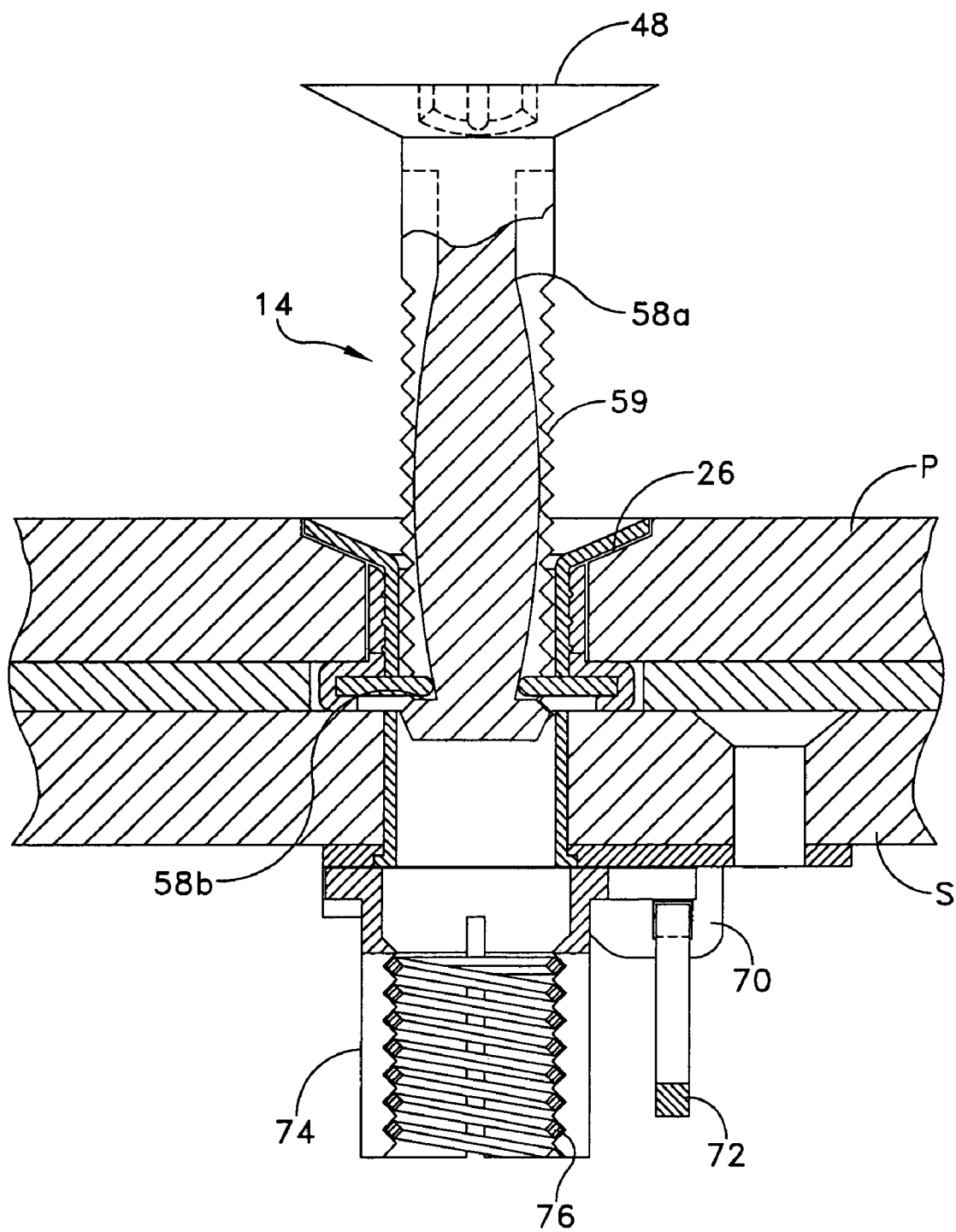
FIG. 10 is a sectional view of the fastener shown in FIG. 1, showing the retaining ring positioned in the second engagement region and the fastener in the extended position as shown in FIG. 2.

As shown in FIGS. 9-10, when fastener 10 is assembled, tabs 40 of retaining ring 20 may be repositioned to engage each engagement region 58a,b in order to position stud 14 in a first, closed position at first engagement region 58a (see FIG. 9), and a second extended position at second engagement region 58b (see FIG. 10). Thus, stud 14 may be retracted or inserted longitudinally in the fastener, allowing tabs 40 to slide over lobe 59 until tabs 40 move between the closed and the engaged positions shown.

When the panels P and S are to be separated or disengaged the stud would be in the position depicted in FIG. 10 in which the stud is disengaged from the nut 74. The retaining ring is then in engagement with one end of the stud at 58b. To engage or secure the panels, the stud 14 is then slid downwardly with the ring tabs 40 riding over the lobe 59 toward the position of FIG. 9. The stud 14 is then screwed into the nut 74. FIG. 9 illustrates the stud in an almost fully secured position. In that position the ring tabs 40 are at the position 58a, as illustrated.

Figure 11:
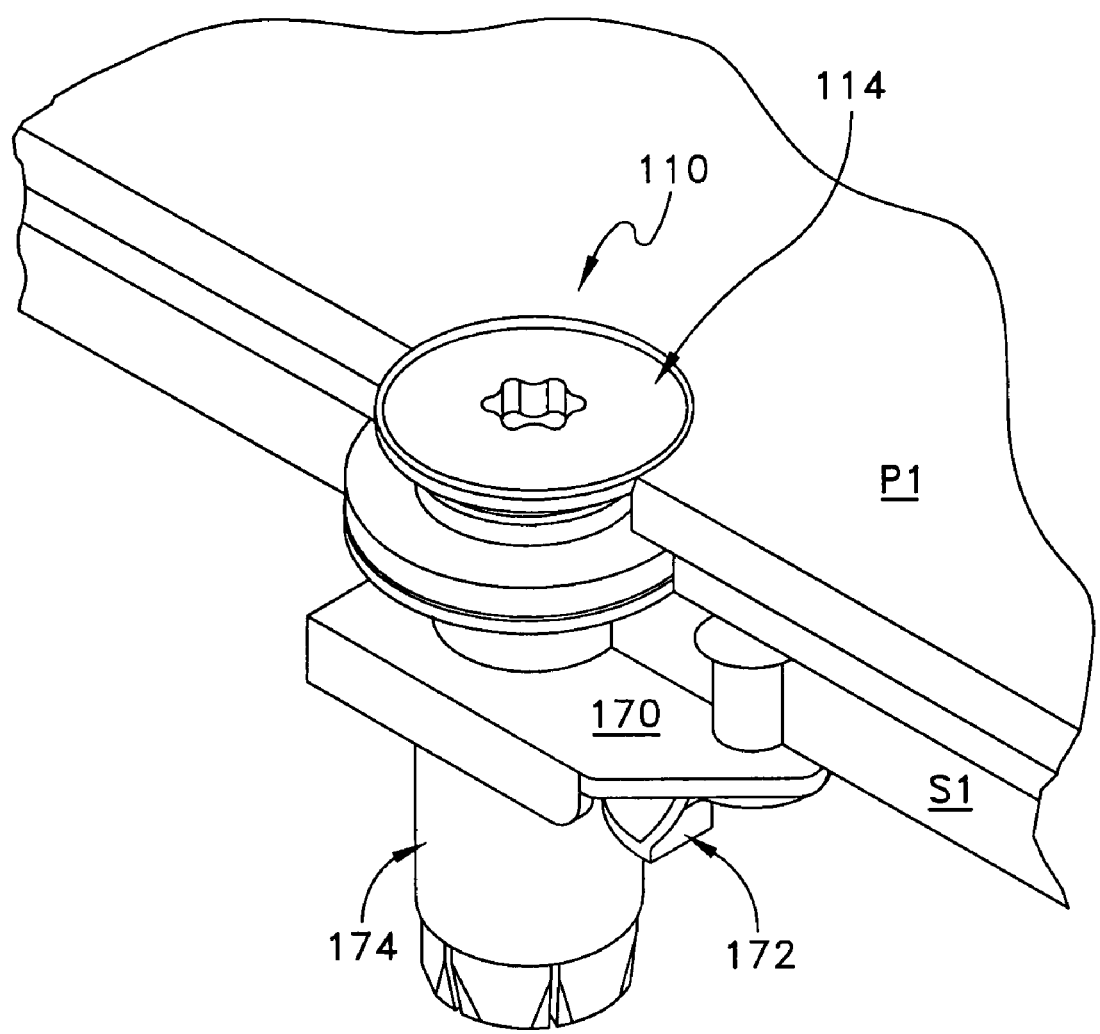
FIG. 11 is a perspective view of another embodiment of a fastener according to the present invention, showing a panel attached to a sub-structure by the fastener, and with the fastener in a closed position.
Figure 12:
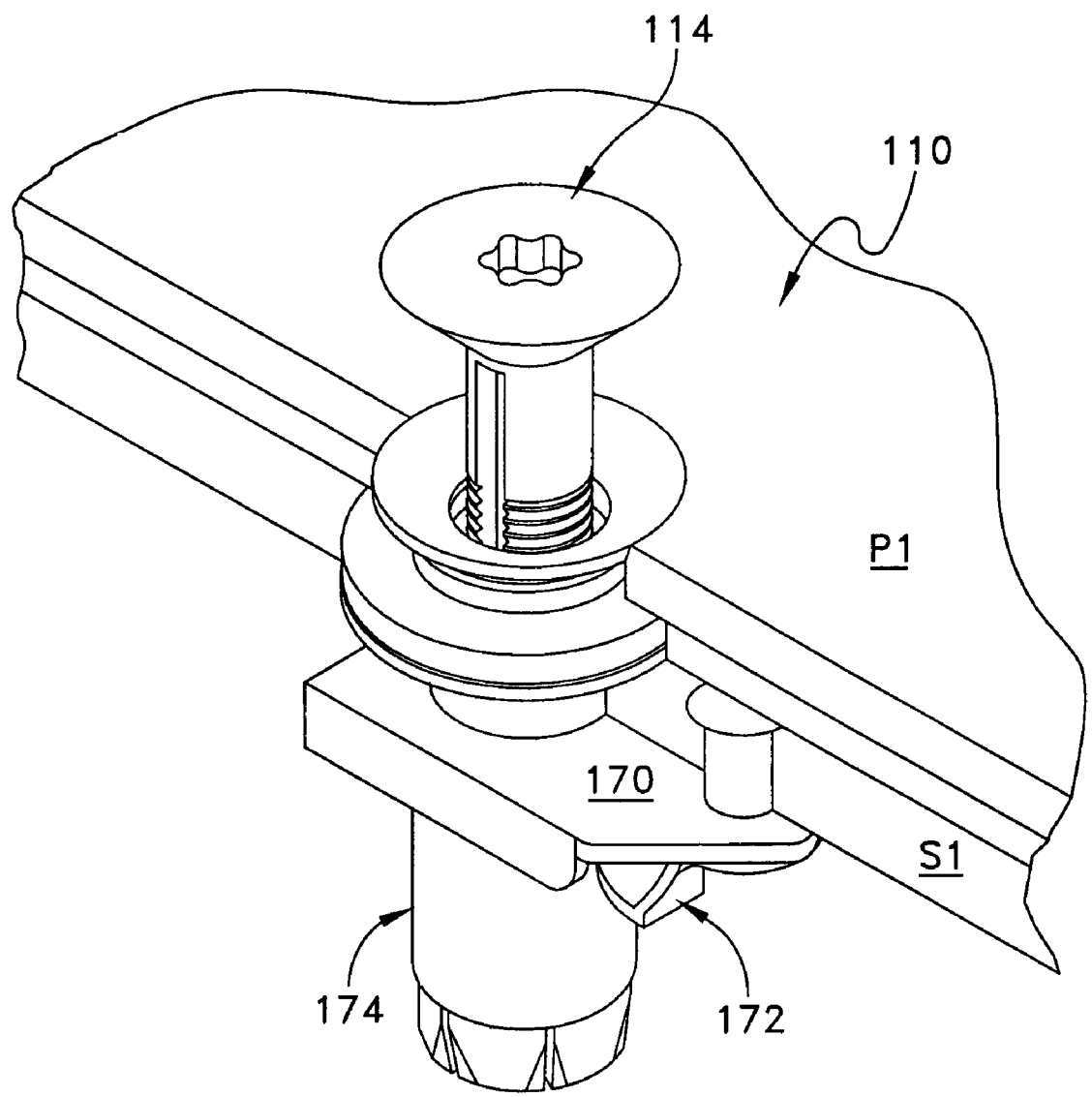
FIG. 12 is a perspective view of the fastener shown in FIG. 11, showing the fastener in an extended position.

Another exemplary embodiment of a fastener 10 according to the present invention is indicated generally at 110 in FIGS. 11 and 12, where it is shown in an assembled configuration attaching a panel "P1" to a sub-structure "S1" with the stud in a first, closed position (FIG. 11), and in a second, extended position (FIG. 12).

Figure 13:
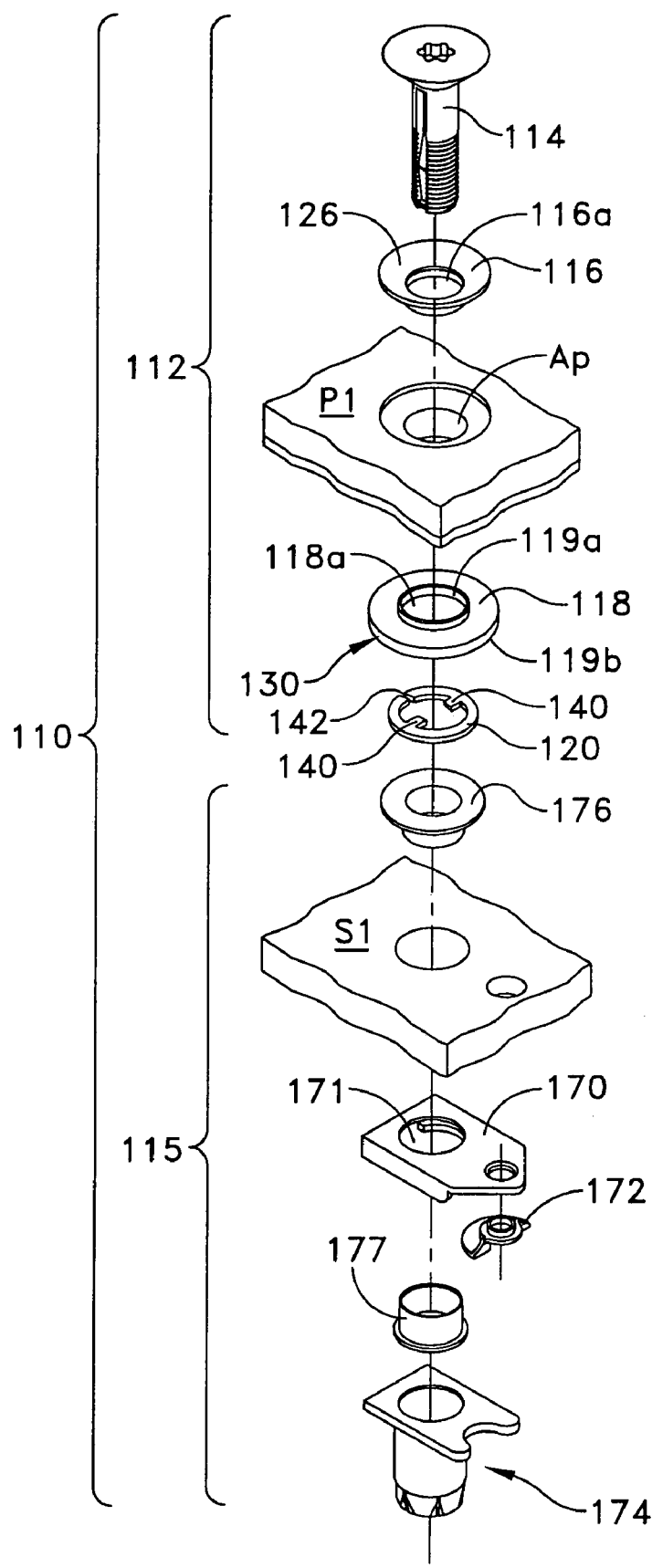
FIG. 13 is an exploded perspective view of the fastener shown in FIG. 11.

As shown in FIG. 13, fastener 110 includes a stud assembly indicated generally at 112 and a receptacle assembly indicated generally at 115. Stud assembly 12 is shown in greater detail in FIG. 14. As shown, stud assembly 112 includes a stud 114, an upper sleeve 116, a lower sleeve 118, and a retaining ring 120. Sleeves 116 and 118 taken together may be considered as a grommet or grommet assembly.

Upper sleeve 116 has a substantially cylindrical wall defining an opening 116a having a diameter sized and configured to receive stud 114 therein. A flange 126 extends outwardly from one end of opening 116a. Upper sleeve 116 may have a substantially smooth interior surface and a threaded exterior surface as in the previous embodiment. Lower sleeve 118 has an upper edge 119a and a lower edge 119b, with an annular lip 130 extending outwardly from lower edge 119b. A substantially cylindrical wall defines an opening 118a sized and dimensioned to receive upper sleeve 116 therein. Lower sleeve 118 may have a substantially smooth exterior surface and a threaded interior surface and may be provided with a plurality of slots (not shown in FIG. 14) extending from a region adjacent to annular lip 130 to upper edge 119a.

In an alternate embodiment the sleeves 116 and 118 may be interengaged in another manner such as by means of a force fit between the components, by tack welding, by the use of adhesives or other appropriate means to hold the sleeves together once they are placed in engagement with the panel P1. It is preferred that the sleeves by engaged by a compression, swage or flair-over fit.

Annular lip 130 defines an interior channel 131 (see FIGS. 18 and 19) sized and dimensioned to receive retaining ring 120 therein, as described below. Retaining ring 120 preferably has a substantially planar circular shape and includes two opposed inwardly protruding tabs 140, and a slot 42 (see FIG. 14) that allow it to be compressed while being inserted into the interior channel 131 of lower sleeve 118. Lower sleeve 118 and, in particular, interior channel 131, provide containment to retaining ring 120 in case of breakage, thus minimizing FOD.

Figure 14:
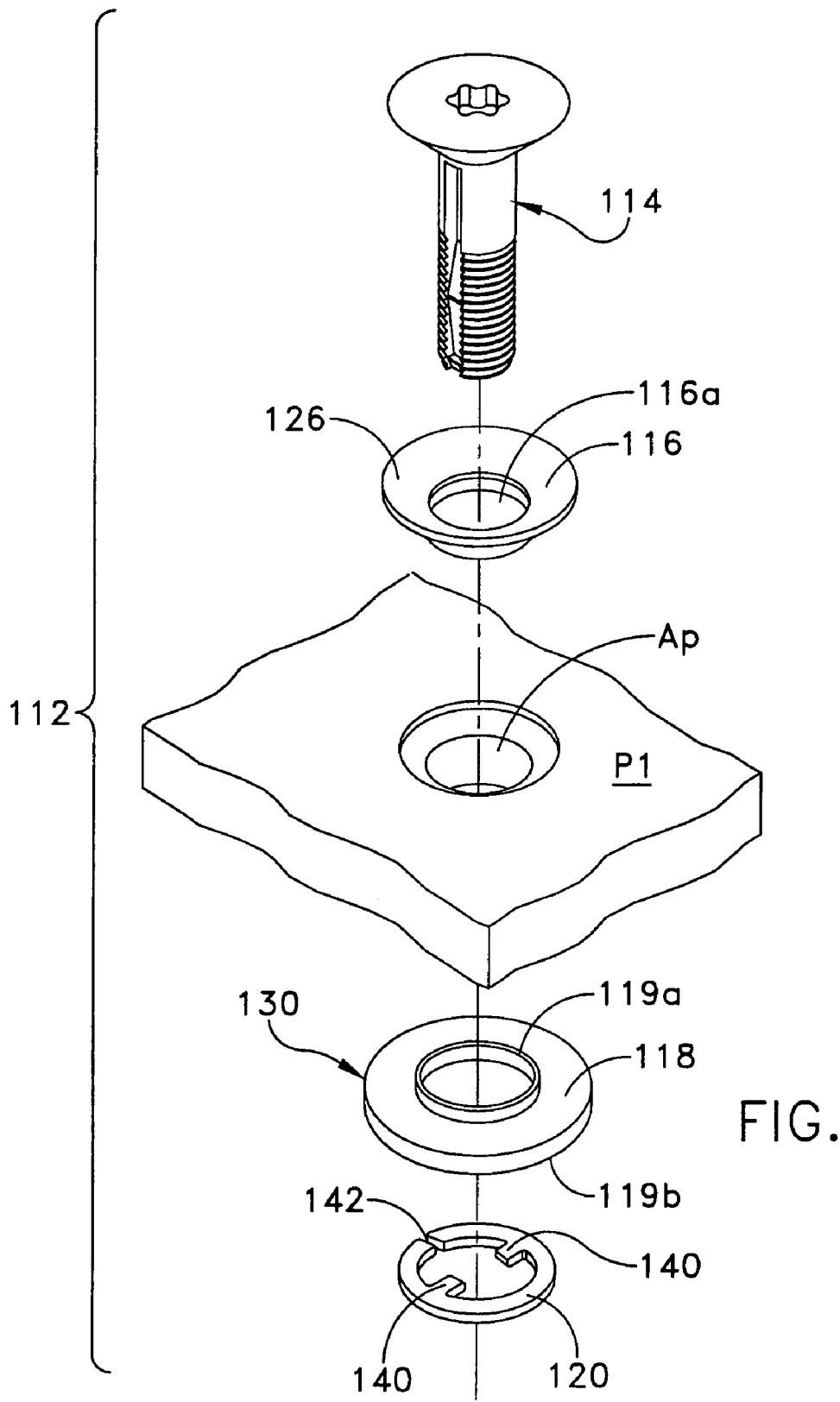
FIG. 14 is an exploded perspective view of the stud assembly of the fastener shown in FIG. 11.
Figure 18:
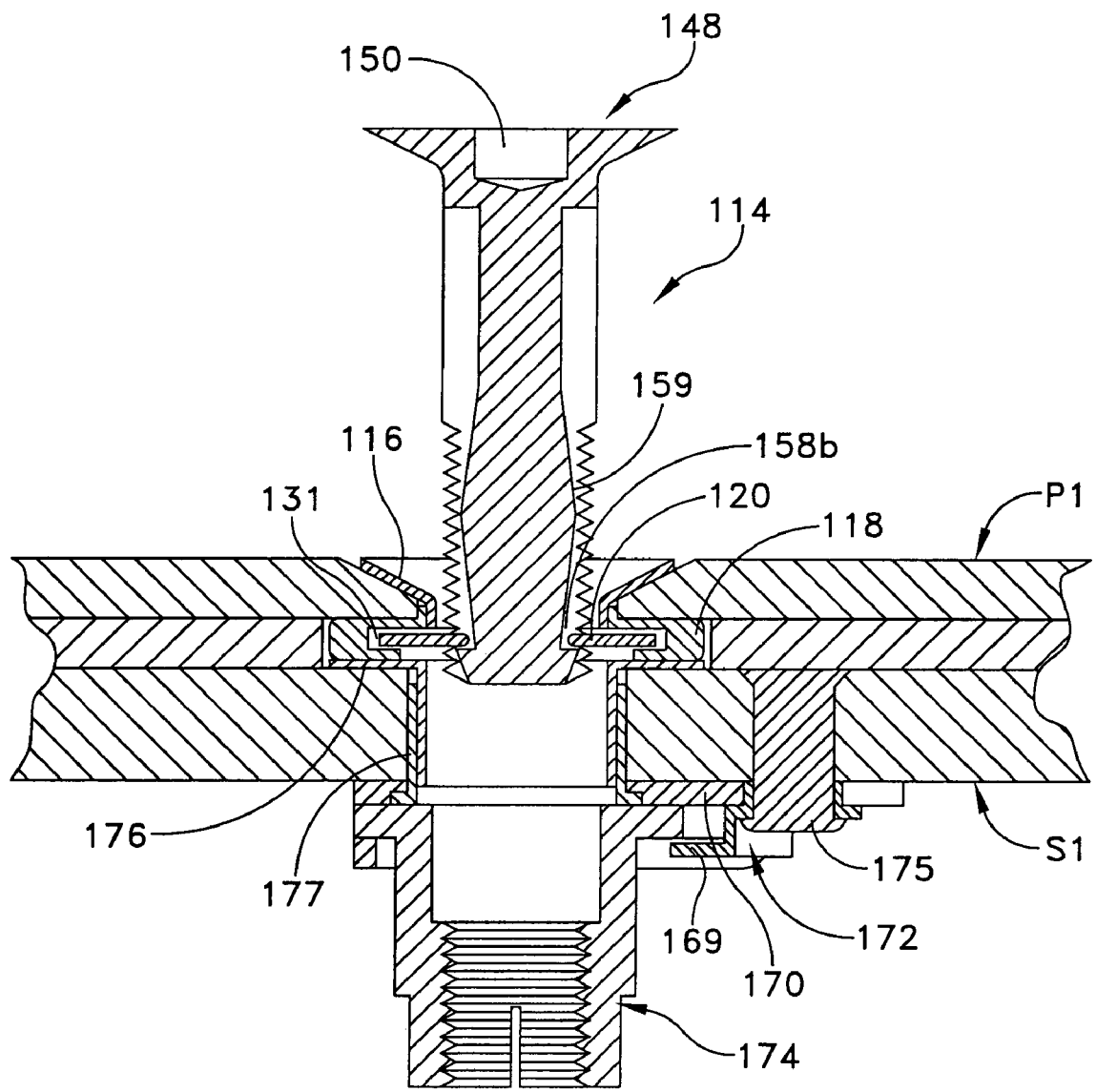
FIG. 18 is a sectional view of the fastener shown in FIG. 11, showing the fastener is the open or released position.
Figure 19:
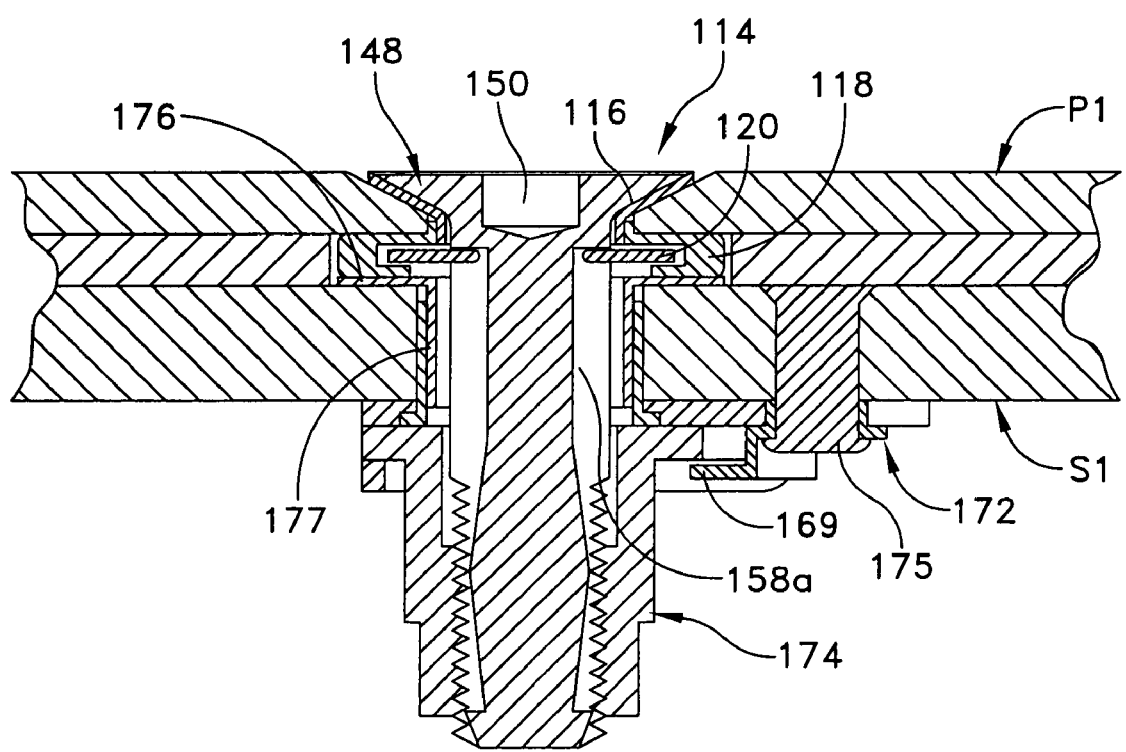
FIG. 19 is a sectional view of the fastener shown in FIG. 11, showing the fastener in the closed or locked position.

Thus when assembled as shown, retaining ring 120 is inserted into interior channel 131 of lower sleeve 118, and lower sleeve 118 is inserted into an aperture Ap. Thereafter, upper sleeve 116 is threaded into lower sleeve 118 or engaged in another appropriate manner. FIG. 14 shows the parts in an exploded position while FIGS. 18 and 19 shows the stud assembly 112 in its finally secured position.

Figure 15:
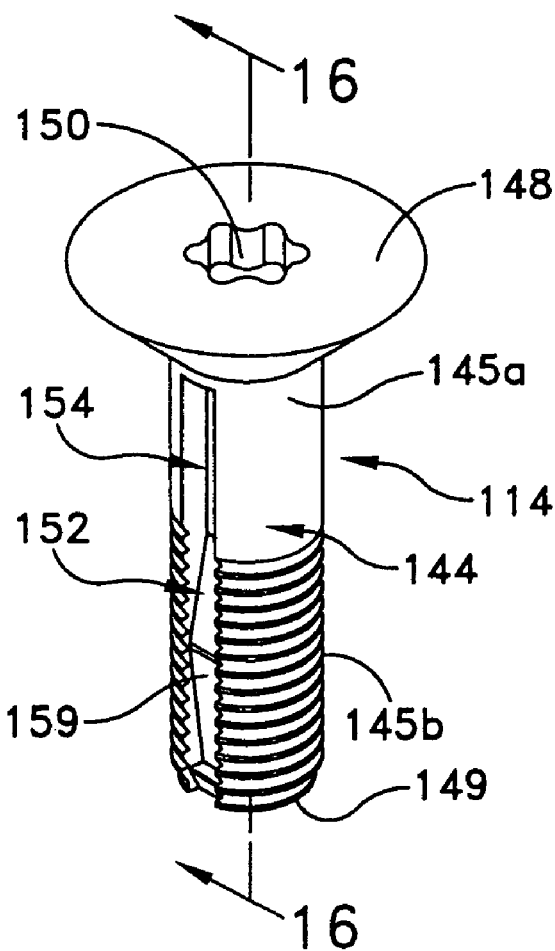
FIG. 15 is a perspective view of the stud shown in the stud assembly shown in FIG. 14.
Figure 16:
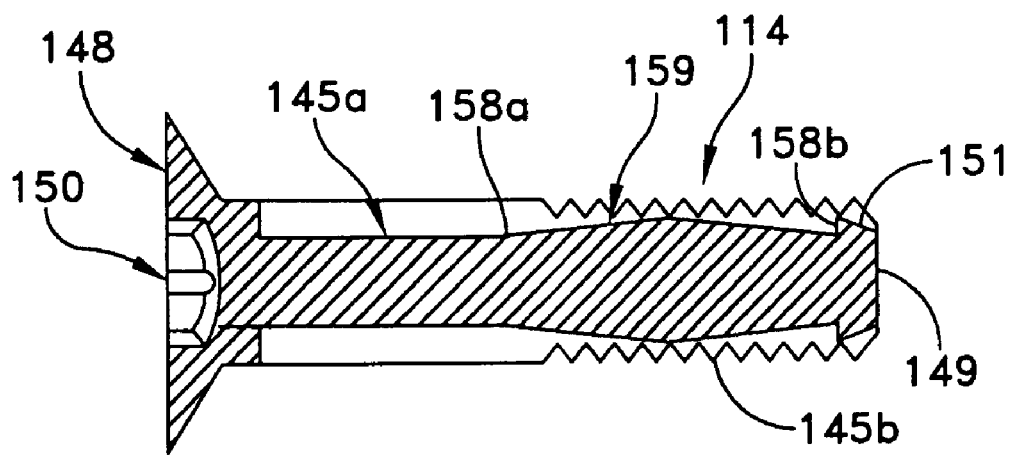
FIG. 16 is a sectional view of the stud shown in FIG. 15.

Stud 114 of stud assembly 112 is shown in greater detail in FIGS. 15 and 16. As shown, stud 114 is substantially symmetrical in construction, and includes a head 148 at one end thereof, a tip 149 at an opposite end thereof, and a shank 144 therebetween. Head 148 includes a recess 150 for receiving a tool that is used in tightening the stud. The tool that may be used is a torque wrench that has the capability of controlling the level of poundage provided so as to tighten the stud to the proper amount of torque.

Shank 144 has an outer surface 145 that includes a substantially smooth section 145a adjacent to head 148 and a threaded exterior surface section 145b extending from smooth section 145a substantially to tip 149. Two longitudinal retaining sections 152, which in the present embodiment are channels, are positioned diametrically opposite one another longitudinally on shank 144. For ease of description, retaining sections 152 will be referred to hereinafter as channels. Channels 152 extend from smooth section 145a of shank 144 through threaded section 145b, substantially to tip 149. Channels 152 preferably are recessed from exterior surface 145 of shank 144.

Each channel 152 includes at least two engagement regions; first engagement region 158a and second engagement region 158b. Engagement regions 158a and 158b are spaced apart by a spacing member 159, and are adapted to engage tabs 140 of retaining ring 120 when the stud and fasteners are assembled together, either in a closed position or in an extended position. In the present embodiment, spacing members 159 are defined by an arcuate region extending upwardly from a base 154 of channels 152. For ease of description, spacing members 159 will be referred to hereinafter as lobes. Lobes 159 preferably have a substantially smooth surface extending from the engagement region 158a to engagement region 158b.

Figure 17:
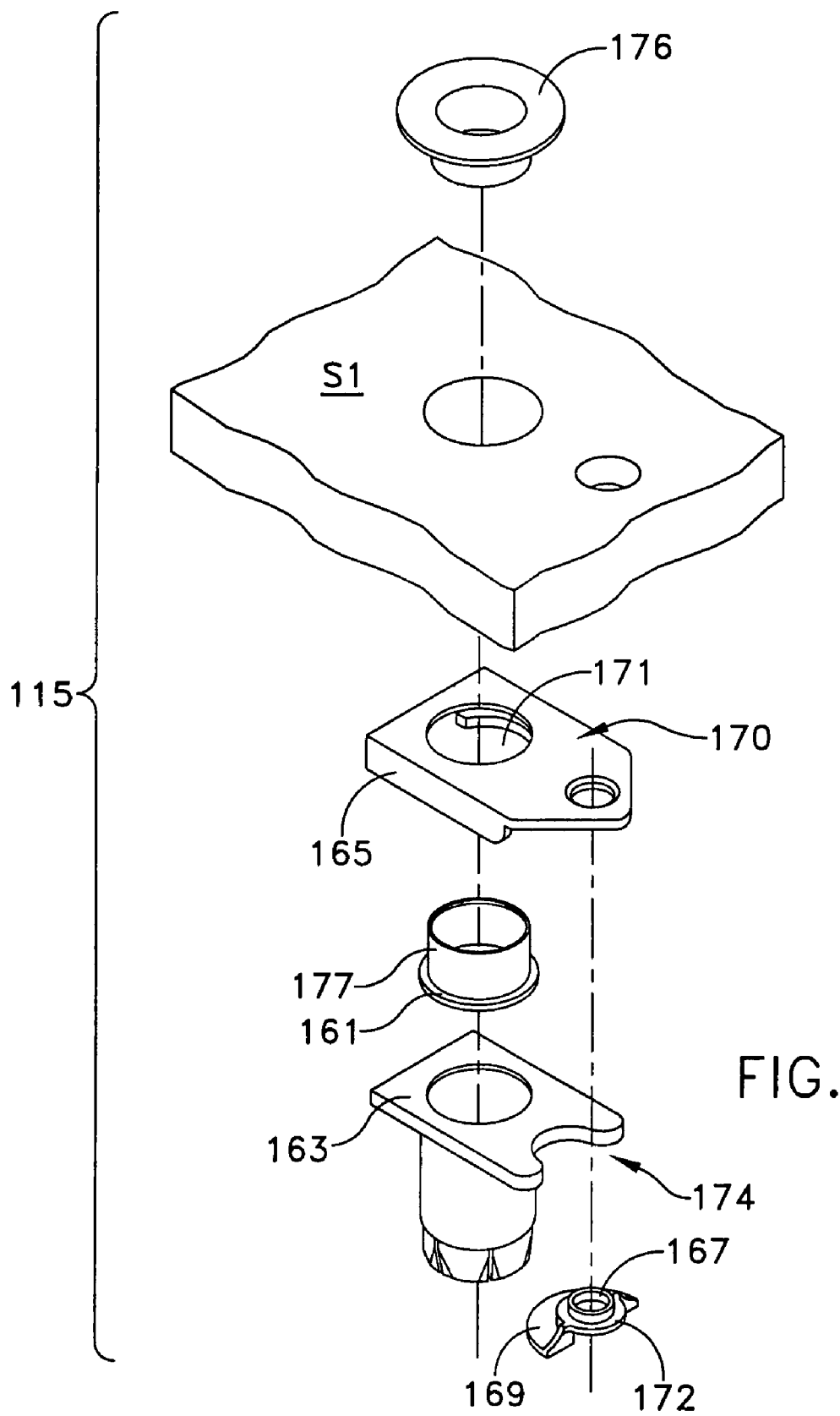
FIG. 17 is an exploded perspective view of the receptacle assembly of the fastener shown in FIG. 11.

Receptacle assembly 115 is illustrated in greater detail in FIG. 17. As shown; receptacle assembly 115 includes a bracket or cage 170, a retaining clamp 172, a nut 174, and a lower sleeve or grommet assembly that includes sleeves 176 and 177. Bracket or cage 170 has a hole 171 that is adapted to receive the sleeve 177. The retaining clamp 172 holds the nut 174 to the bracket 170. A rivet 175 through the retaining clamp 172 holds the nut 174 in place, as depicted in FIGS. 18 and 19. FIGS. 18 and 19 depict the rivet 175 firmly holding the nut to the substrate S. The rivet 175 extends through the retaining clamp 172, through a hole in the cage 170 and through the hole provided in the substrate S. The retaining clamp is preferably provided with a ledge 160 that retains the nut 174 in place. This clamping effect is shown in FIGS. 18 and 19. The retaining clamp 172 also has an upwardly extending collar 167 that fits within the hole in the cage 170.

The receptacle assembly 115 is provided with a bracket that may be similar to brackets described in earlier application Ser. No. 10/137,011. For example the bracket 170 may include a sidewall or track at 165 that receives the top plate 163 of the nut 174. That inter-engagement along with the securing by the rivet 175 assures that the entire receptacle assembly is firmly in place and not able to loosen.

The sleeves 176 and 177 may be interlocked by providing threads therebetween or the sleeves may be interlocked together in another manner including, for example, by a force fit between the sleeves or by other appropriate means. The base 161 of the sleeve 177 also engages with the top plate of the nut 174, such as is illustrated in FIG. 18.

As shown in FIGS. 18 and 19, when fastener 110 is assembled, tabs 140 of retaining ring 120 may be repositioned to engage each engagement region 158a,b in order to position stud 114 in a first, closed position at first engagement region 158a (see FIG. 19), and a second extended position at second engagement region 158b (see FIG. 18). Thus, stud 114 may be retracted or inserted longitudinally in the fastener, allowing tabs 140 to slide over lobe 159 until tabs 140 move between the closed and the engaged positions shown.

When the panels P and S are to be separated or disengaged the stud would be in the position depicted in FIG. 18 in which the stud is disengaged from the nut 174. The retaining ring is then in engagement with one end of the stud at 158b. To engage or secure the panels, the stud 114 is then slid downwardly with the ring tabs 140 riding over the lobe 159 toward the position of FIG. 19. The stud 114 is then screwed into the nut 174. FIG. 9 illustrates the stud in a fully secured position. In that position the ring tabs 140 are at the position 158a, as illustrated.

Thus, the fastener of the present invention has a simple hold-out feature in which the fastener can assume either the position of FIG. 18 in which it is held out or disengaged and yet still held in place, or can assume the position of FIG. 19 in which the fastener has been fully seated in its corresponding nut to fully secure the panels together. It is noted that even in the position of FIG. 18 the stud is prevented from disengaging from the panel by virtue of the retaining ring holding the stud at the engagement region 158b.

Figure 20:
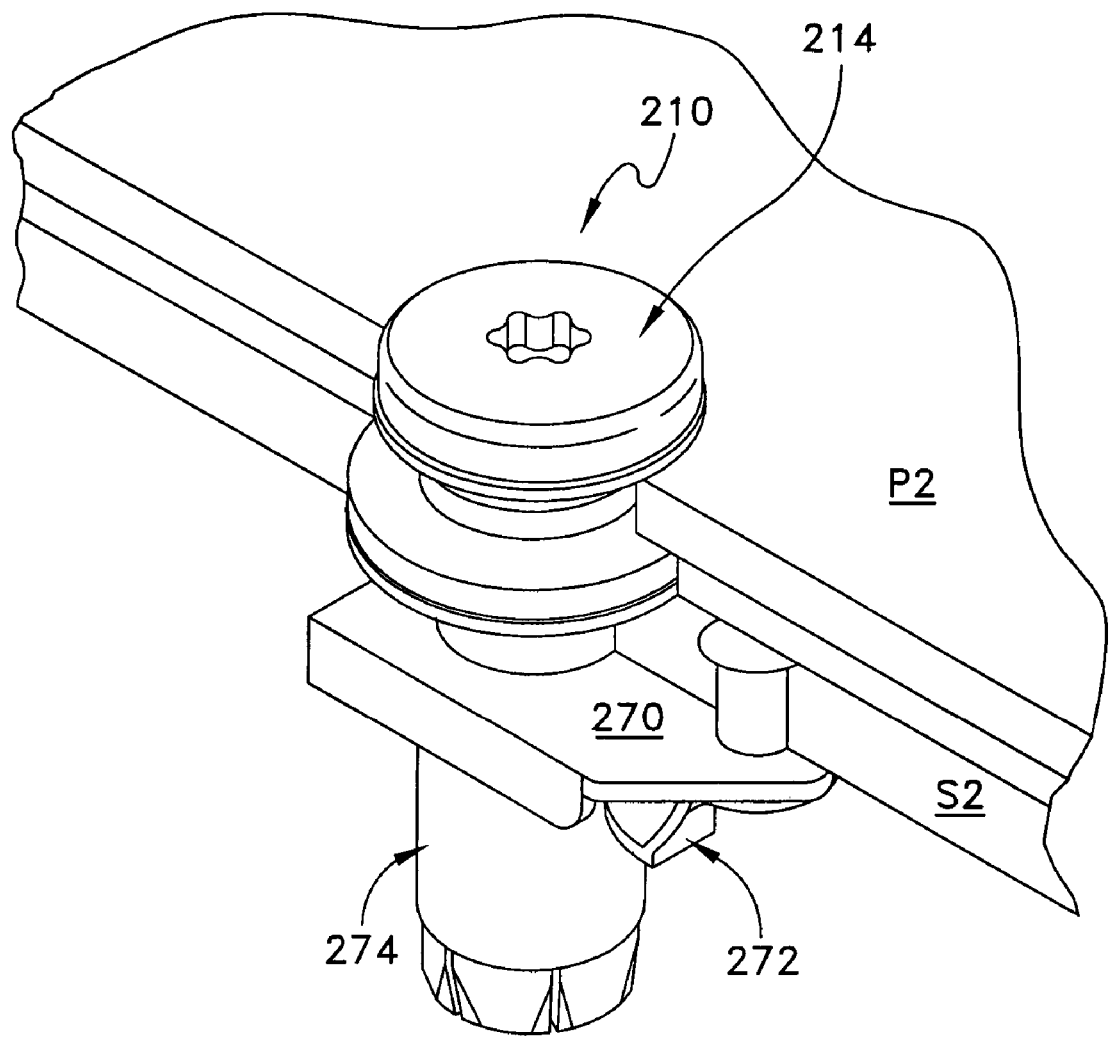
FIG. 20 is a perspective view of still another embodiment of a fastener according to the present invention, showing a panel attached to a sub-structure by the fastener, and with the fastener in a closed position.
Figure 21:
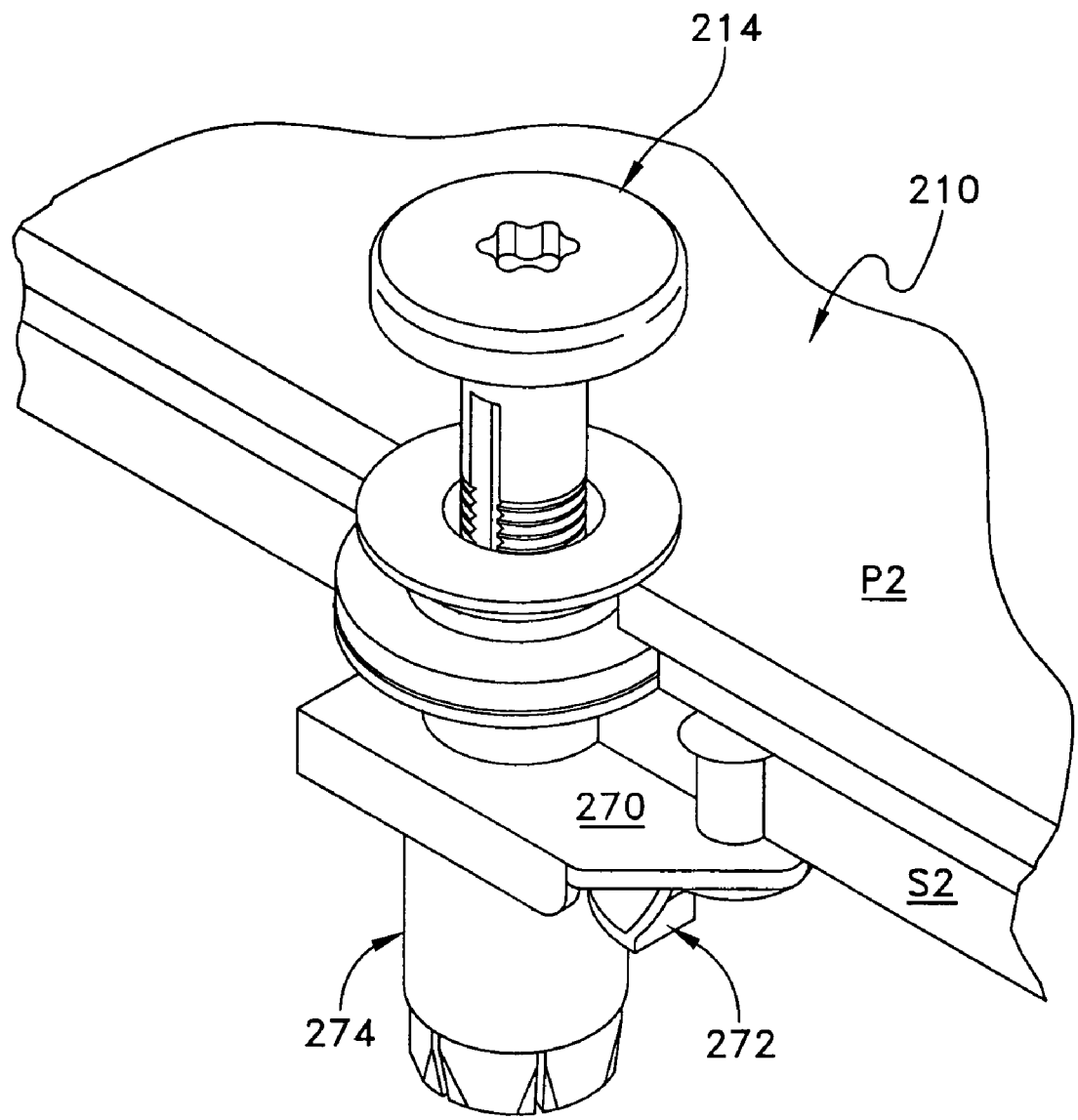
FIG. 21 is a perspective view of the fastener shown in FIG. 20, showing the fastener in an extended position.

Still another exemplary embodiment of a fastener 210 according to the present invention is indicated generally at 210 in FIGS. 20 and 21, where it is shown in an assembled configuration attaching a panel "P2" to a sub-structure "S2" with the stud in a first, closed position (FIG. 20), and in a second, extended position (FIG. 21).

Figure 22:
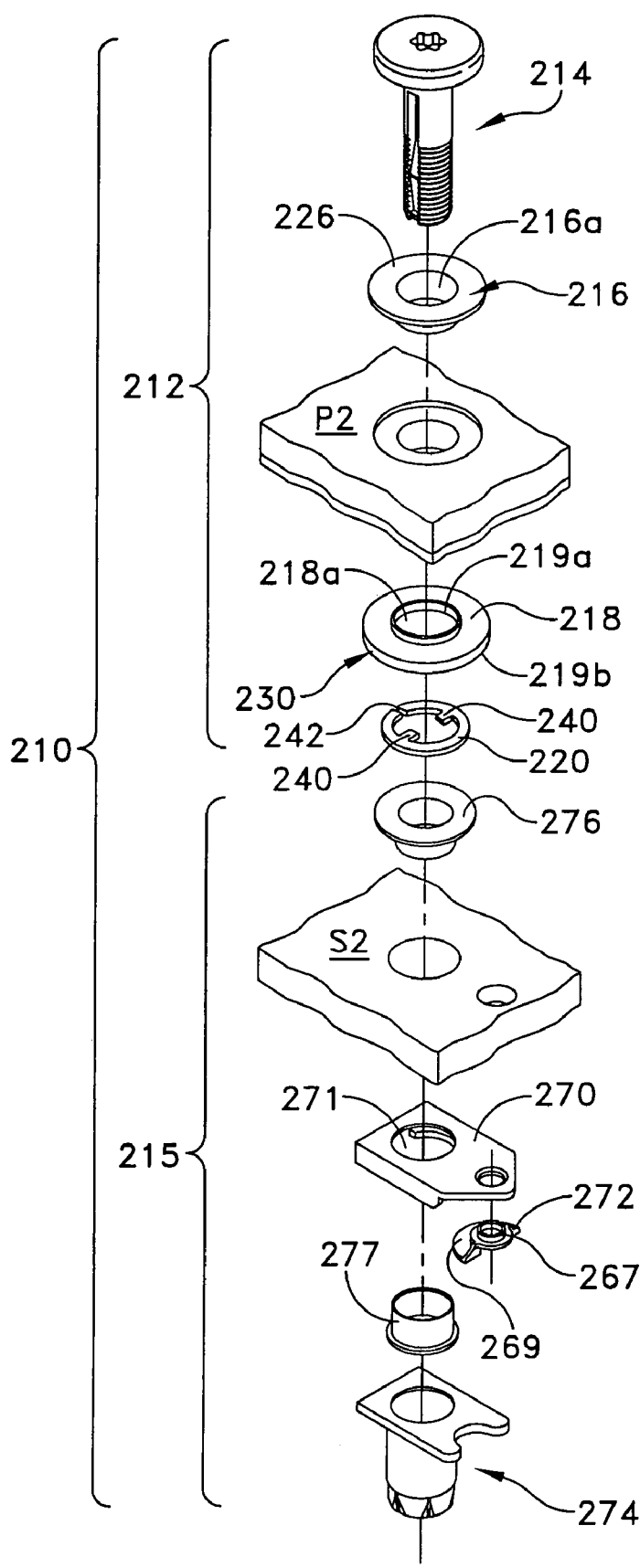
FIG. 22 is an exploded perspective view of the fastener shown in FIG. 20.

As shown in FIG. 22, fastener 210 includes a stud assembly indicated generally at 212 and a receptacle assembly indicated generally at 215. Stud assembly 212 is shown in greater detail in FIG. 23. As shown, stud assembly 212 includes a stud 214, an upper sleeve 216, a lower sleeve 218, and a retaining ring 220. Sleeves 216 and 218 may be considered as a grommet.

Upper sleeve 216 has a substantially cylindrical wall defining an opening 216a having a diameter sized and configured to receive stud 214 therein. A flange 126 extends outwardly from one end of opening 216a. Upper sleeve 216 may have a substantially smooth interior surface and a threaded exterior surface as in the previous embodiment. Lower sleeve 218 has an upper edge 219a and a lower edge 219b, with an annular lip 230 extending outwardly from lower edge 219b. A substantially cylindrical wall defines an opening 218a sized and dimensioned to receive upper sleeve 216 therein. Lower sleeve 218 may have a substantially smooth exterior surface and a threaded interior surface with a plurality of slots extending from a region adjacent to annular lip 230 to upper edge 219a.

In an alternate embodiment the sleeves 216 and 218 may be interengaged in another manner such as by means of a force fit between the components, by interference fit or swage fit, by the use of adhesives or other appropriate means to hold the sleeves together.

Annular lip 230 defines an interior channel 231 (see FIGS. 27 and 28) sized and dimensioned to receive retaining ring 220 therein, as described below. Retaining ring 220 preferably has a substantially planar circular shape and includes two opposed inwardly protruding tabs 240, and a slot 242 (see FIG. 23) that allow it to be compressed while being inserted into the interior channel 231 of lower sleeve 218. Lower sleeve 218 and, in particular, interior channel 231, provide containment to retaining ring 220 in case of breakage, thus minimizing FOD.

Figure 23:
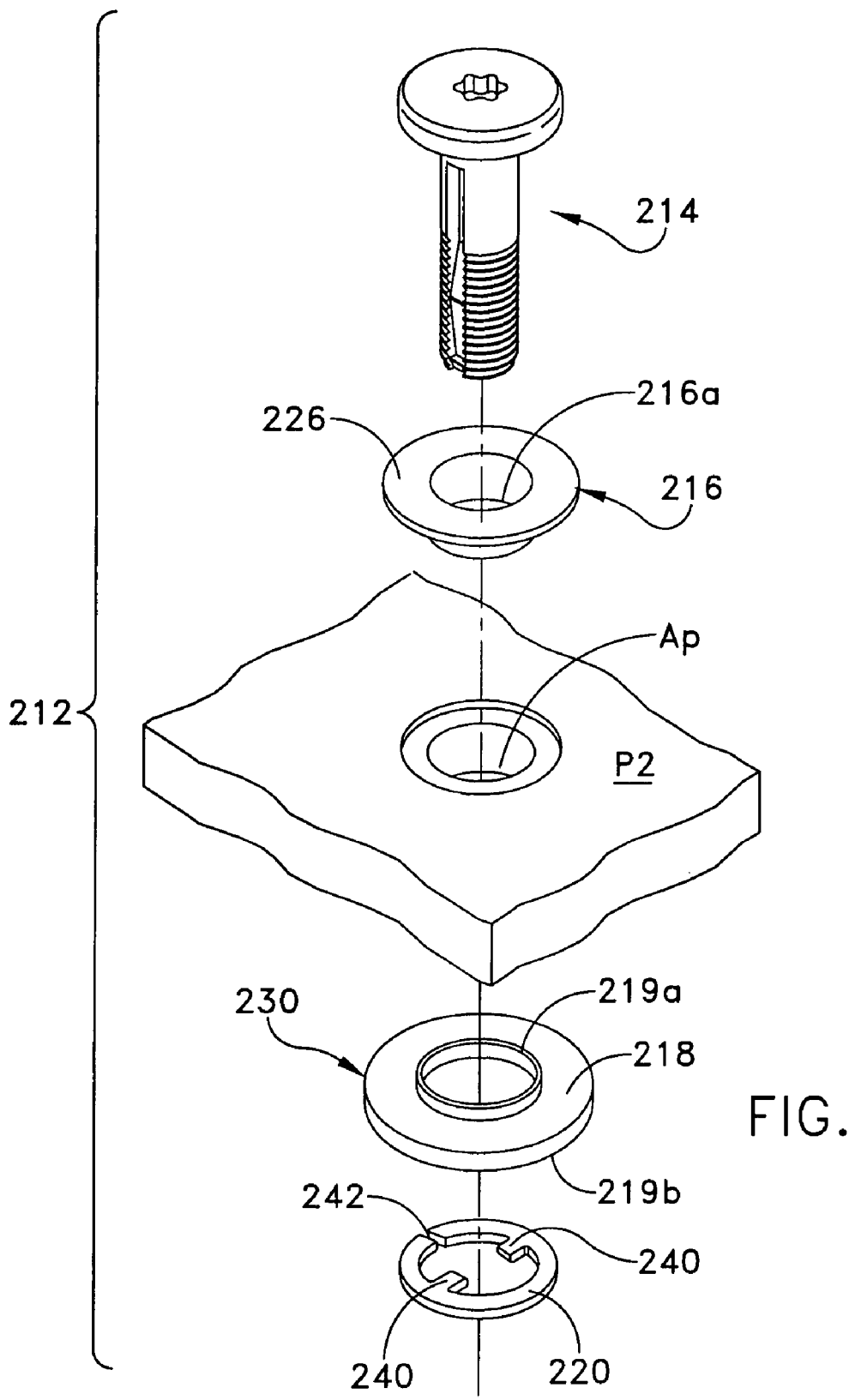
FIG. 23 is an exploded perspective view of the stud assembly of the fastener shown in FIG. 20.
Figure 27:
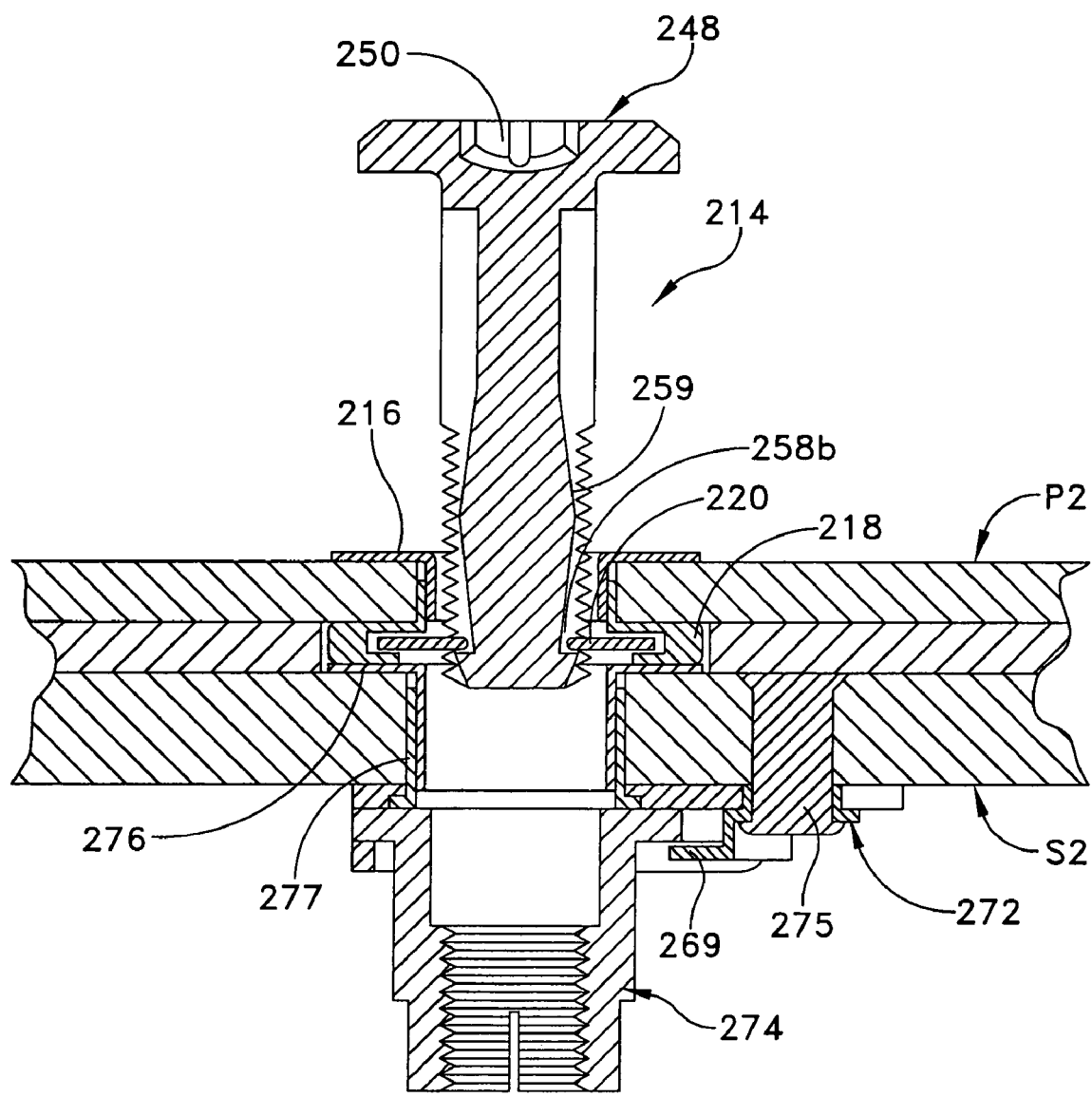
FIG. 27 is a sectional view of the fastener shown in FIG. 20, showing the fastener is the open or released position.
Figure 28:
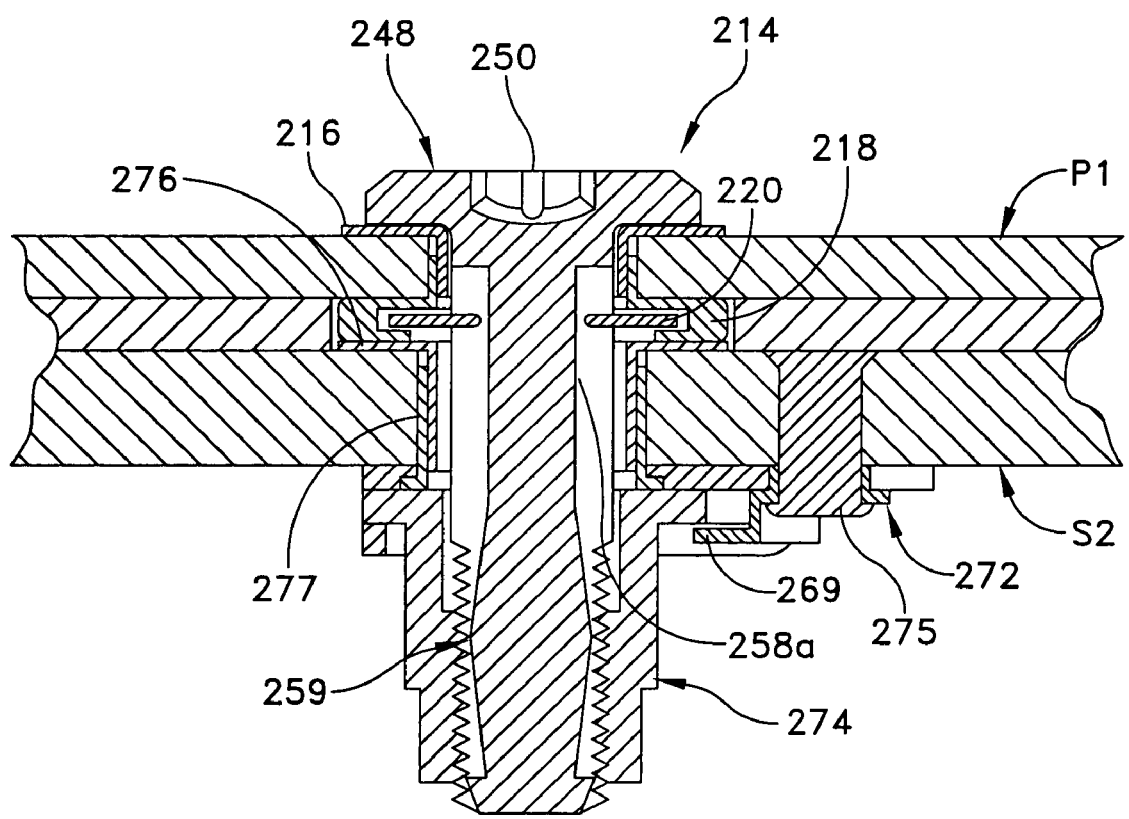
FIG. 28 is a sectional view of the fastener shown in FIG. 20, showing the fastener in the closed or locked position.

Thus when assembled as shown, retaining ring 220 is inserted into interior channel 231 of lower sleeve 218, and lower sleeve 218 is inserted into an aperture Ap. Thereafter, upper sleeve 216 is threaded into lower sleeve 218 or engaged in another appropriate manner. FIG. 23 shows the parts in an exploded position while FIGS. 27 and 28 shows the stud assembly 212 in its finally secured position.

Figure 24:
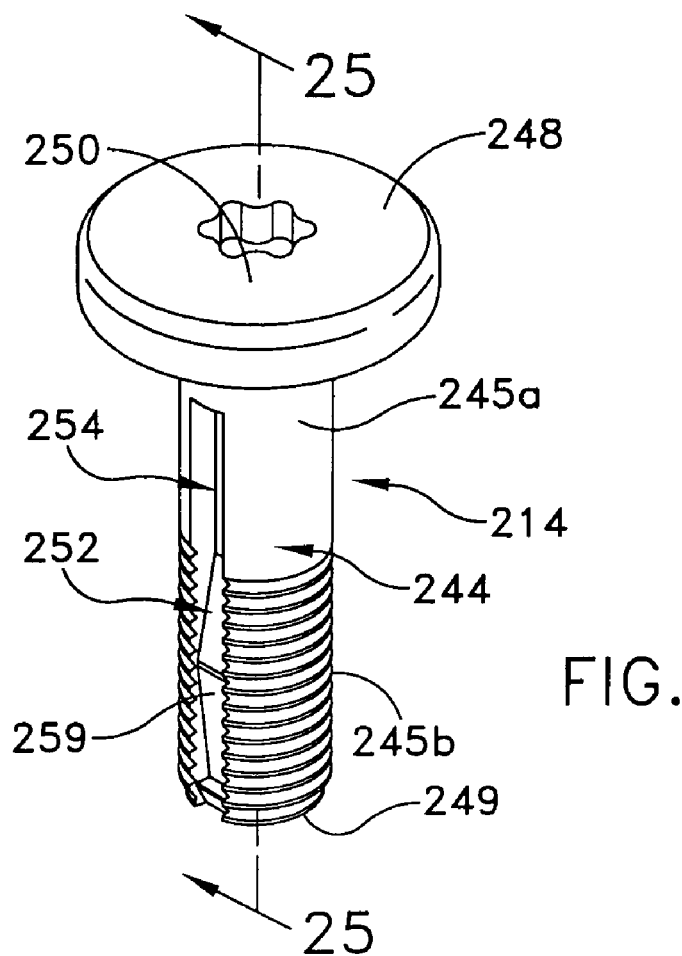
FIG. 24 is a perspective view of the stud shown in the stud assembly shown in FIG. 23.
Figure 25:
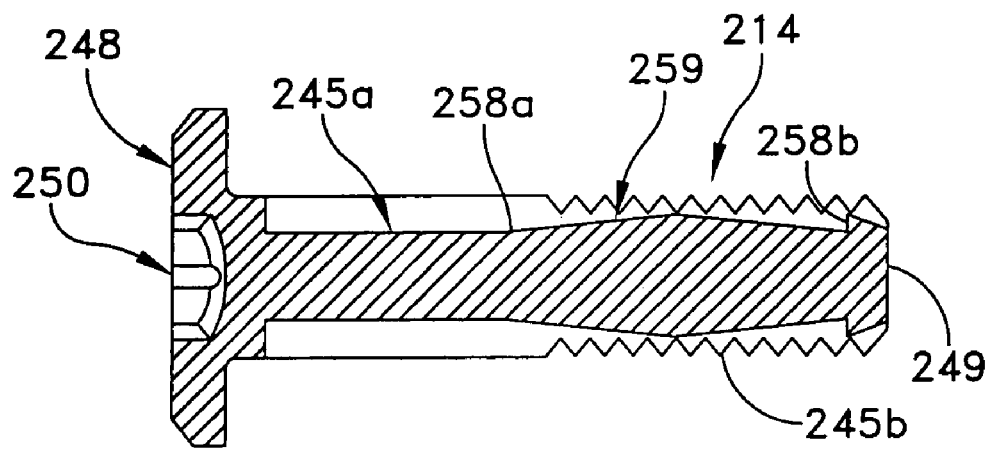
FIG. 25 is a sectional view of the stud shown in FIG. 24.

Stud 214 of stud assembly 212 is shown in greater detail in FIGS. 24 and 25. As shown, stud 214 is substantially symmetrical in construction, and includes a head 248 at one end thereof, a tip 249 at an opposite end thereof, and a shank 244 therebetween. Head 248 includes a recess 250 for receiving a tool that is used in tightening the stud.

Shank 244 has an outer surface 245 that includes a substantially smooth section 245a adjacent to head 248 and a threaded exterior surface section 245b extending from smooth section 245a substantially to tip 249. Two longitudinal retaining sections 252, which in the present embodiment are channels, are positioned diametrically opposite one another longitudinally on shank 244. For ease of description, retaining sections 252 will be referred to hereinafter as channels. Channels 252 extend from smooth section 245a of shank 244 through threaded section 245b, substantially to tip 249. Channels 252 preferably are recessed from exterior surface 245 of shank 244.

Each channel 252 includes at least two engagement regions; first engagement region 258a and second engagement region 258b. Engagement regions 258a and 258b are spaced apart by a spacing member 259, and are adapted to engage tabs 240 of retaining ring 220 when the stud and fasteners are assembled together, either in a closed position or in an extended position. In the present embodiment, spacing members 259 are defined by an arcuate region extending upwardly from a base 254 of channels 252. For ease of description, spacing members 259 will be referred to hereinafter as lobes. Lobes 259 preferably have a substantially smooth surface extending from the engagement region 258a to engagement region 258b.

Figure 26:
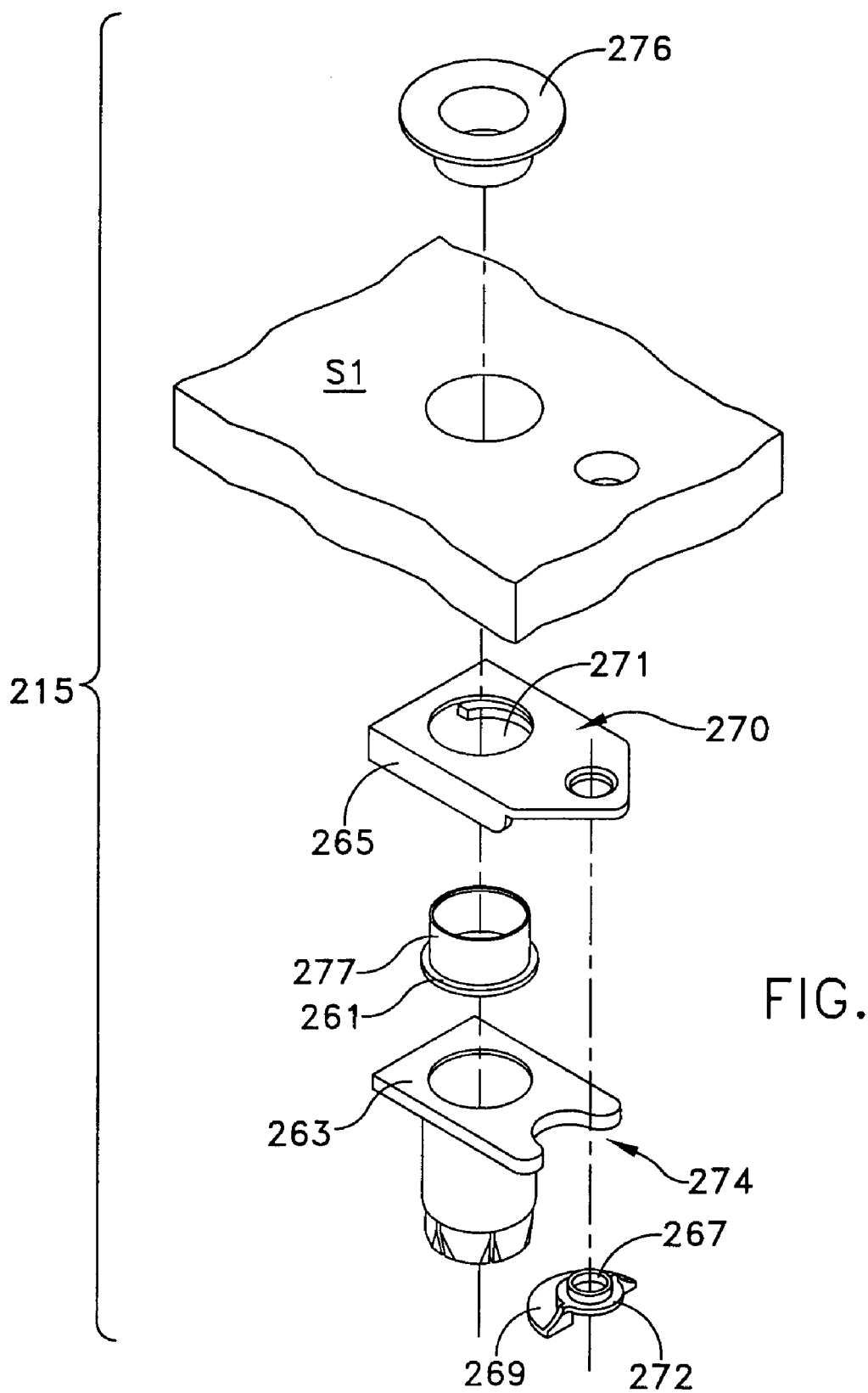
FIG. 26 is an exploded perspective view of the receptacle assembly of the fastener shown in FIG. 20.

Receptacle assembly 215 is illustrated in greater detail in FIG. 26. As shown, receptacle assembly 215 includes a bracket or cage 270, a retaining clamp 272, a nut 274, and a lower sleeve or grommet assembly that includes sleeves 276 and 277. Bracket or cage 270 has a hole 271 that is adapted to receive the sleeve 277. The retaining clamp 272 holds the nut 274 to the bracket 270. A rivet 275 through the retaining clamp 272 holds the nut 274 in place, as depicted in FIGS. 27 and 28. FIGS. 27 and 28 depict the rivet 275 firmly holding the nut to the substrate S2. The rivet 275 extends through the retaining clamp 272, through a hole in the cage 270 and through the hole provided in the substrate S2. The retaining clamp is preferably provided with a ledge 269 that retains the nut 274 in place. This clamping effect is shown in FIGS. 27 and 28. The retaining clamp 272 also has an upwardly extending collar 267 that fits within the hole in the cage 270.

The receptacle assembly 215 is provided with a bracket that may be similar to brackets described in earlier application Ser. No. 10/137,011. For example the bracket 270 may include a sidewall or track at 265 that receives the top plate 263 of the nut 274. That inter-engagement along with the securing by the rivet 275 assures that the entire receptacle assembly is firmly in place and not able to loosen.

The sleeves 276 and 277 may be interlocked by providing threads therebetween or the sleeves may be interlocked together in another manner including, for example, by a force fit between the sleeves or by other appropriate means. The base 261 of the sleeve 277 also engages with the top plate of the nut 274, such as is illustrated in FIG. 27.

As shown in FIGS. 27 and 28, when fastener 210 is assembled, tabs 240 of retaining ring 220 may be repositioned to engage each engagement region 258a,b in order to position stud 214 in a first, closed position at first engagement region 258a (see FIG. 28), and a second extended position at second engagement region 258b (see FIG. 27). Thus, stud 214 may be retracted or inserted longitudinally in the fastener, allowing tabs 240 to slide over lobe 259 until tabs 240 move between the closed and the engaged positions shown.

When the panels P and S are to be separated or disengaged the stud would be in the position depicted in FIG. 27 in which the stud is disengaged from the nut 274. The retaining ring is then in engagement with one end of the stud at 258b. To engage or secure the panels, the stud 214 is then slid downwardly with the ring tabs 240 riding over the lobe 259 toward the position of FIG. 28. The stud 214 is then screwed into the nut 274. FIG. 28 illustrates the stud in a fully secured position. In that position the ring tabs 240 are at the position 258a, as illustrated.

Thus, the fastener of the present invention has a simple hold-out feature in which the fastener can assume either the position of FIG. 27 in which it is held out or disengaged and yet still held in place, or can assume the position of FIG. 28 in which the fastener has been fully seated in its corresponding nut to fully secure the panels together. It is noted that even in the position of FIG. 27 the stud is prevented from disengaging from the panel by virtue of the retaining ring holding the stud at the engagement region 258b.

Another feature of the fastener of the present invention relates to the ease with which the stud can be engaged with the receptacle. For this purpose the distal end 149 of the stud is provided with an annular ramp 151 as depicted in FIG. 16. This configuration would also be used in the last embodiment that is described in FIGS. 24 and 25. The ramp 151 is helpful for alignment and engagement of the stud with the receptacle assembly.

When used as structural components, the foregoing fastener may be formed from materials capable of withstanding high stress, such as steel. Individual components may be formed from other materials such as structural plastics, composites, shape memory alloys, and the like. In a preferred embodiment, the nut may be formed from a polyamide available under the product name VESPEL®. In other preferred embodiments, structural plastics such as fiber reinforced polymers also may be used for certain components to reduce the weight of the assembly. One type of material is a fiberglass reinforced polymer that includes about 30 percent to about 60 percent, by weight, of fiberglass. This concentration may vary, of course, depending upon the matrix polymer, the source of the material, the type of fiber, etc.

As mentioned previously, the bracket of each of the foregoing receptacle assemblies may be unitary or may be assembled from separate components. In addition, the length of the collars may vary in order to accommodate different panel thicknesses. When the foregoing brackets are unitary, they are typically formed by die casting, which necessitates the formation of a different cast for each desired bracket, and each collar length. One way around this problem is to form a single cast for each type of bracket, using the longest collar length, and achieving shorter collar lengths by grinding off part of the collar. Each of the foregoing is time consuming and expensive. In a preferred embodiment of the present disclosure, the bracket or cage is formed as two components: a bracket portion and a removable collar or sleeve that mates or is friction fitted with bracket portion.

In the embodiments described in FIGS. 11-28 the various components can be secured together in various ways. By way of example in FIG. 18 the sleeves 116 and 118 may be engaged by means of a compression fit between the sleeves. This preferred over a threading because in this particular structure there is only a small amount of space for threading. Also, in FIG. 18 the sleeve 177 may be compression fit with the bracket opening 171 and, thereafter the sleeve 176 may be compression fit with the sleeve 177. The retaining clamp may be swage-fit at collar 167 with the bracket 170. The ledge 169 engages the plate 163 about the end with the legs.

Another feature of the present invention is the capability of securing the receptacle assembly in a very easy manner, preferably with the use of only a single securing member such as the illustrated rivet. Of course, other securing devices can also be used such as a bolt, screw or the like.

While this disclosure has been particularly shown and described with references to preferred embodiments thereof, it will be understood by those skilled in the art that various changes in form and details may be made therein without departing from the spirit and scope of the disclosure as defined by the appended claims.

What is claimed is:

1. A fastening assembly, comprising:
a stud assembly including a stud, a retaining ring including two oppositely disposed tabs protruding toward the center of the retaining ring, a first sleeve that is mainly engageable with a second sleeve, the second sleeve including an inwardly disposed channel for receiving the retaining ring; and
a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough;
wherein the stud includes a base, a head, and a shank disposed therebetween, the shank including an exterior surface having a threaded section, the exterior surface including at least two longitudinal channels, each channel including at least two engagement regions for engaging the tabs of the retaining ring;
wherein the grommet assembly comprises first and second sleeves that are engaged between a substrate panel to form said bore;
wherein the retaining clamp engages both the bracket and the nut and provides a single point attachment of the receptacle assembly to the substrate panel;
wherein the retaining clamp includes a top collar and a peripheral ledge, the collar engaging with a hole in the bracket and the ledge engaging with the nut.

2. The fastening assembly of claim 1, wherein the at least two engagement regions are spaced apart by a spacing region.

3. The fastening assembly of claim 2, wherein the spacing region is defined by a lobe protruding from the interior surface of the channel between each of the engagement regions and between sidewalls of the channels.

4. The fastening assembly of claim 1, wherein the internally threaded nut includes a substantially planar top portion that is engageable with a support track of the bracket.

5. A fastening assembly, comprising:
a stud assembly including a stud, a retaining ring including two oppositely disposed tabs protruding toward the center of the retaining ring, and an upper grommet assembly including an inwardly disposed channel for receiving the retaining ring; and
a receptacle assembly, the receptacle assembly including a bracket constructed and arranged to be secured to a panel, an internally threaded nut, a retaining clamp for securing the nut in the bracket, and a lower grommet assembly having a bore for receiving the stud therethrough;
wherein the stud includes a base, a head, and a shank disposed therebetween, the shank including an exterior surface having a threaded section, the exterior surface including at least two longitudinal channels, each channel including at least two engagement regions for engaging the tabs of the retaining ring;
wherein the lower grommet assembly comprises first and second sleeves that are engaged between a substrate panel to form said bore;
wherein the retaining clamp engages both the bracket and the nut and provides a single point attachment of the receptacle assembly to the substrate panel;
wherein the retaining clamp includes a top collar and a peripheral ledge, the collar engaging with a hole in the bracket and the ledge engaging with the nut.

6. The fastening assembly of claim 5, wherein the first and second sleeves of the lower grommet assembly are engaged by a compression or force fit.

7. The fastening assembly of claim 6, wherein the second sleeve is force or compression fit with said bracket.

8. The fastening assembly of claim 5, wherein the at least two engagement regions are spaced apart by a spacing region.

9. The fastening assembly of claim 8, wherein the spacing region is defined by a lobe protruding from the interior surface of the channel between each of the engagement regions and between sidewalls of the channels.

10. A fastening assembly, comprising:
a stud assembly including a stud, a retaining ring including two oppositely disposed tabs protruding toward the center of the retaining ring, and at least one sleeve including an inwardly disposed channel for receiving the retaining ring; and
a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough;
wherein the stud includes a base, a head, and a shank disposed therebetween, the shank including an exterior surface having a threaded section, the exterior surface including at least two longitudinal channels, each channel including at least two engagement regions for engaging the tabs of the retaining ring;
wherein the retaining clamp engages both the bracket and the nut and provides a single point attachment of the receptacle assembly to the substrate panel;
wherein the retaining clamp includes a top collar and a peripheral ledge, the collar engaging with a hole in the bracket and the ledge engaging with the nut.

11. The fastening assembly of claim 10 wherein the grommet assembly comprises first and second sleeves that are engaged between a substrate panel to form said bore.

12. The fastening assembly of claim 11 wherein the first and second sleeves of the lower grommet assembly are engaged by a compression or force fit.

13. The fastening assembly of claim 12 wherein the second sleeve is force or compression fit with said bracket.

14. The fastening assembly of claim 13, wherein the at least two engagement regions are spaced apart by a spacing region.

15. A fastening assembly, comprising:
a stud assembly including a stud, a retaining ring including two oppositely disposed tabs protruding toward the center of the retaining ring, a first sleeve that is mainly engageable with a second sleeve, the second sleeve including an inwardly disposed channel for receiving the retaining ring; and
a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough;

wherein the inwardly disposed channel of the second sleeve of the stud assembly is defined by opposed walls that capture the retaining ring therebetween, and said retaining ring is circumferentially compressible for insertion into and retention by said inwardly disposed channel;

wherein the stud includes a base, a head, and a shank disposed therebetween, the shank including an exterior surface having a threaded section, the exterior surface including at least two longitudinal channels, each channel including at least two engagement regions for engaging the tabs of the retaining ring;

wherein the at least two engagement regions are spaced apart by a spacing region and the spacing region is defined by a single lobe protruding from the interior surface of the channel between each of the engagement regions and between sidewalls of the channels;

wherein each channel extends longitudinally and continuously from one end to the opposite end of the threaded section of the shank;

and wherein said single lobe also extends substantially from one end to the opposite end of the threaded section of the shank and includes a peak point where the depth of the channel is smallest in comparison to the rest of the channel.

16. The fastening assembly of claim 15, wherein the retaining ring has a slot so as to enable the retaining ring to be circumferentially compressible.

17. The fastening assembly of claim 15, wherein the lobe is formed as an arcuate region.

18. The fastening assembly of claim 15, wherein the lobe is formed by opposite ramps terminating at said respective engagement regions.

19. The fastening assembly of claim 18, wherein the opposite ramps have the peak point where the ramps join.

20. The fastening assembly of claim 15, wherein the opposed walls of the second sleeve of the stud assembly includes a lower wall having a central passage of a diameter smaller than the outer diameter of the retaining ring and said retaining ring has a slot so as to enable the retaining ring to be circumferentially compressible so that the diameter thereof is smaller than said central passage so as to enable insertion of the retaining ring into said inwardly disposed channel.

21. A fastening assembly, comprising:
a stud assembly including a stud, a retaining ring including two oppositely disposed tabs protruding toward the center of the retaining ring, a first sleeve that is mainly engageable with a second sleeve, the second sleeve including an inwardly disposed channel for receiving the retaining ring; and
a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough;
wherein the inwardly disposed channel of the second sleeve of the stud assembly is defined by opposed walls that capture the retaining ring therebetween, and said retaining ring is circumferentially compressible for insertion into and retention by said inwardly disposed channel;
wherein the opposed walls of the second sleeve of the stud assembly includes a lower wall having a central passage of a diameter smaller than the outer diameter of the retaining ring and said retaining ring has a slot so as to enable the retaining ring to be circumferentially compressible so that the diameter thereof is smaller than said central passage so as to enable insertion of the retaining ring into said inwardly disposed channel
wherein the stud includes a base, a head, and a shank disposed therebetween, the shank including an exterior surface having a threaded section, the exterior surface including at least two longitudinal channels, each channel including at least two engagement regions for engaging the tabs of the retaining ring;
and wherein the at least two engagement regions are spaced apart by a spacing region and the spacing region is defined by a lobe protruding from the interior surface of the channel between each of the engagement regions and between sidewalls of the channels, and wherein the lobe defines a peak point where the depth of the channel is smallest in comparison to the rest of the channel;
wherein only one symmetrically shaped lobe is provided and each channel extends longitudinally and continuously from one end to the opposite end of the threaded section of the shank.

22. The fastening assembly of claim 21 wherein the peak is defined by equal length ramps.

23. A fastening assembly for connecting separate upper and lower panels and comprising:
a stud assembly including a stud, a retaining ring including two oppositely disposed tabs protruding toward the center of the retaining ring, a first sleeve that is mainly engageable with a second sleeve, the second sleeve including an inwardly disposed channel for receiving the retaining ring;
wherein the inwardly disposed channel of the second sleeve of the stud assembly is defined by opposed walls that capture the retaining ring therebetween;
a receptacle assembly, the receptacle assembly including a bracket constructed and arranged to be secured to a panel, an internally threaded nut, a retaining clamp for securing the nut in the bracket, and a grommet assembly including means defining a bore for receiving the stud therethrough;
said grommet assembly of the receptacle assembly including an upper sleeve that is mainly engageable with a lower sleeve, said bracket having a first hole for receiving the lower sleeve and a second hole;
said retaining clamp including a hole that is for alignment with the second hole of the bracket;
a fastener that extends though the retaining clamp hole, the second hole of the bracket and a hole in the lower panel so as to secure the bracket and retaining clamp in place;
wherein the retaining clamp, by means of the fastener, engages both the bracket and the nut and provides a single point attachment of the receptacle assembly to the lower panel;
wherein the stud includes a base, a head, and a shank disposed therebetween, the shank including an exterior surface having a threaded section, the exterior surface including at least two longitudinal channels, each channel including two engagement regions at opposed ends of each channel for engaging the opposed respective tabs of the retaining ring;
and wherein the at least two engagement regions are spaced apart by a spacing region and the spacing region is defined by a lobe protruding from the interior surface of the channel between each of the engagement regions and between sidewalls of the channels, and wherein the lobe defines a peak point where the depth of the channel is smallest in comparison to the rest of the channel.

24. The fastening assembly of claim 23 wherein the retaining clamp includes a top collar and a peripheral ledge, the collar engaging with the second hole in the bracket and the ledge engaging with the nut.

25. The fastening assembly of claim 23 wherein the retaining clamp includes a top collar and a peripheral ledge, the collar engaging with a hole in the bracket and the ledge engaging with the nut.

26. The fastening assembly of claim 23 wherein said retaining ring is circumferentially compressable for insertion into and retention by said inwardly disposed channel and the lobe comprises only a single lobe.

* * * * *